United States Patent [19]
Nakajima et al.

[11] Patent Number: 6,141,178
[45] Date of Patent: *Oct. 31, 2000

[54] ACCESSOR HAND MECHANISM HAVING GROOVES FOR OPENING AND CLOSING FINGERS

[75] Inventors: Kenji Nakajima; Tsuyoshi Inokuchi, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/964,453

[22] Filed: Nov. 4, 1997

Related U.S. Application Data

[62] Division of application No. 08/503,717, Jul. 18, 1995, Pat. No. 5,781,517.

[30] Foreign Application Priority Data

Oct. 31, 1994 [JP] Japan ...................................... 6-266509
Dec. 15, 1994 [JP] Japan ...................................... 6-311699

[51] Int. Cl.⁷ ............................ G11B 15/68; G11B 17/22
[52] U.S. Cl. ............................................... 360/92; 369/38
[58] Field of Search ........................... 360/92, 93; 369/38, 369/191; 242/338, 337.1, 339

[56] References Cited

U.S. PATENT DOCUMENTS

| | | | |
|---|---|---|---|
| 4,071,858 | 1/1978 | Ejiri | 360/93 |
| 4,907,889 | 3/1990 | Simone | 360/92 |
| 5,010,536 | 4/1991 | Wanger et al. | 360/98.06 |
| 5,144,508 | 9/1992 | Noda et al. | 360/99.06 |
| 5,146,375 | 9/1992 | Satoh et al. | 360/92 |
| 5,392,266 | 2/1995 | Kobayashi et al. | 369/36 |
| 5,412,521 | 5/1995 | Dalziel | 360/92 |
| 5,450,391 | 9/1995 | Pollard | 369/191 |

FOREIGN PATENT DOCUMENTS

| | | |
|---|---|---|
| 0 371 707 A3 | 6/1990 | European Pat. Off. . |
| 0 389 160 A3 | 9/1990 | European Pat. Off. . |
| 0 407 305 A3 | 1/1991 | European Pat. Off. . |
| 43 13 373 A 1 | 11/1993 | Germany . |
| 60-182047 | 9/1985 | Japan . |
| 60-182048 | 9/1985 | Japan . |
| 63-293747 | 11/1988 | Japan . |
| 2-42671 | 2/1990 | Japan . |
| 2-064959 | 3/1990 | Japan . |
| 4-134752 | 5/1992 | Japan . |

*Primary Examiner*—David Davis
*Attorney, Agent, or Firm*—Greer, Burns & Crain, Ltd.

[57] ABSTRACT

A stopper for stopping an ejected cartridge at a predetermined point before the cartridge leaves a drive unit. The stopper permits an accessor to insert the cartridge into the drive unit. In addition, in ejecting the cartridge from the drive unit, the stopper stops the cartridge before the cartridge obstructs movement of the accessor.

9 Claims, 32 Drawing Sheets

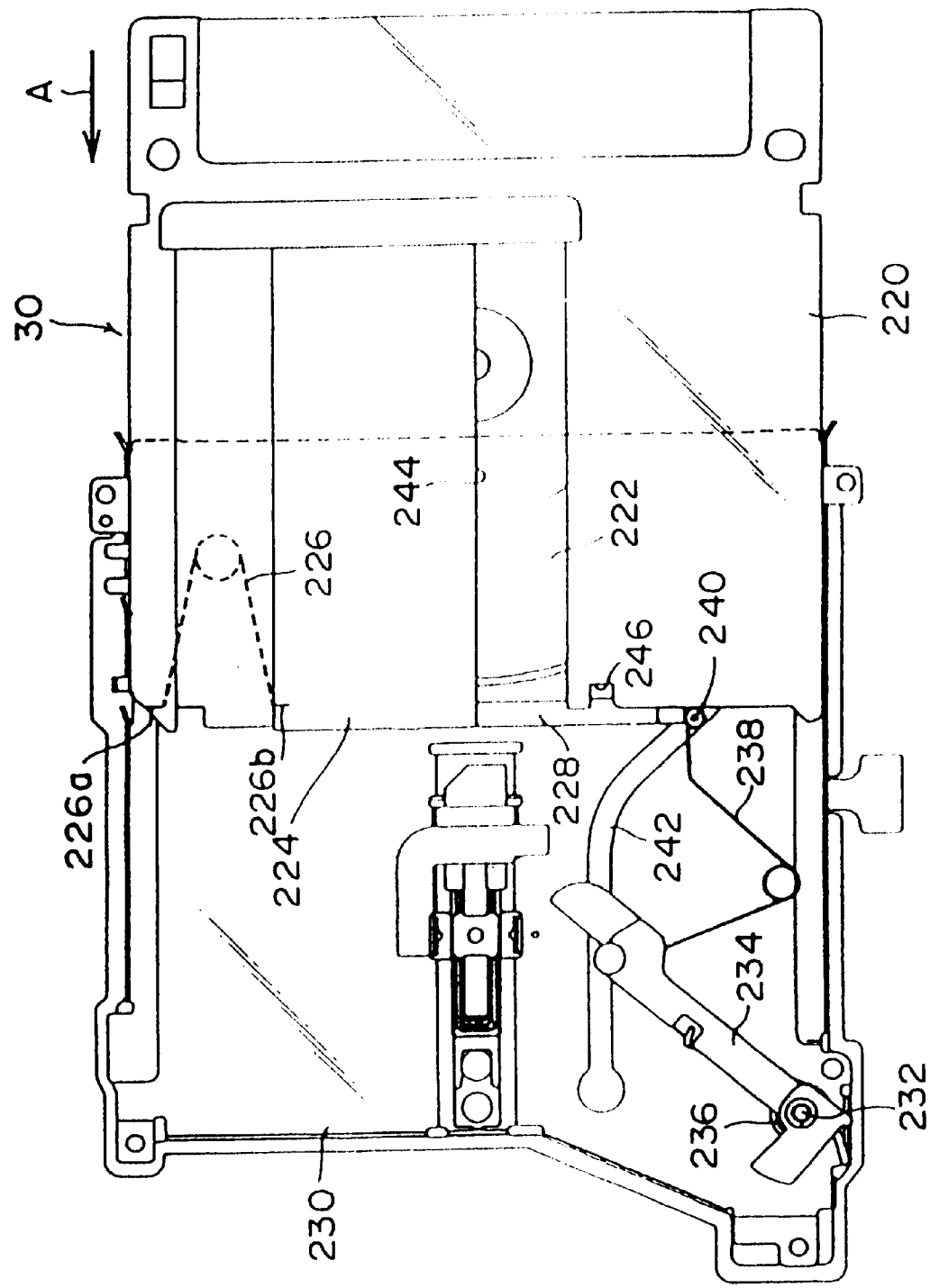

ACCESSOR HAND MECHANISM HAVING GROOVES FOR OPENING AND CLOSING FINGERS

This is a divisional of application Ser. No. 08/503,717 filed on Jul. 18, 1995, now U.S. Pat. No. 5,781,517.

BACKGROUND OF THE INVENTION

1. Field of the Invention

The present invention relates generally to a library device, and more particularly to an accessor hand mechanism in a library device.

2. Description of the Related Art

A library device is a device for containing a plurality of information recording medium cartridges such as optical disk cartridges or magnetic tape cartridges, loading a selected one of the cartridges into a drive unit, and reading/writing information from/to the medium. In recent years, an optical disk library device in particular has been increasingly demanded for data retrieval requiring a large storage capacity as in retrieving multimedia, image data, graphic data, etc., and it is desired to provide a mass-storage optical disk library device which can be installed in a small space and can contain more optical disk cartridges.

In general, an optical disk library device is composed of a cartridge access station (CAS) for loading and unloading an optical disk cartridge into and from the library device, a cell drum having a plurality of cells each for containing the cartridge, a drive unit for reading and writing data from and to a recording medium contained in the cartridge, and an accessor for carrying the cartridge between the cartridge access station, the cell drum, and the drive unit. Such an optical disk library device has recently been used as an external mass-storage device for a computer, and the library device is required to reliably even without operator intervention.

The accessor is provided with a hand unit or hand mechanism vertically movable along a guide shaft, and the hand unit has a pair of fingers for gripping the cartridge. The hand unit is required to perform an operation for opening and closing the fingers, and a slide operation for advancing and retracting the fingers. A conventional accessor hand unit employs a plurality of motors dedicated for these operations.

That is, a plurality of motors are mounted on an accessor mechanism portion designed to be vertically moved, causing an increase in weight and capacity of the accessor. In the conventional accessor, a driving power of about 150 watts is necessary for a motor for vertically driving the accessor mechanism portion. In the conventional accessor hand unit, the fingers and a portion for pushing the cartridge interfere with a front panel of the drive unit, and the cartridge cannot therefore be carried to a loading position of the drive unit.

Accordingly, in the case where general inexpensive drive units not specially developed for the library device are mounted in the library device, it is necessary to mount a cartridge transfer mechanism for each drive unit, causing a considerable increase in cost. Further, in the conventional accessor, a vertical sliding portion of the accessor and a base of the hand unit are integrated. With this integral structure, every time maintenance and replacement of the hand unit are required, a side panel and an upper panel of the library device must be removed to take out the guide shaft. Thus, the conventional accessor has a problem in maintainability such that the maintenance and replacement of the hand unit cannot be performed in the field, or much time for maintenance is necessary.

On the other hand, in the case where drive units specially developed for the library device are used, the cartridge can be directly transferred between the accessor and each drive unit. However, as the cartridge is forcibly ejected from the drive unit by the action of an eject spring, the cartridge is allowed to be ejected only when the accessor has reached the front side of the drive unit.

In other words, if the cartridge is forcibly ejected from the drive unit in the condition where the accessor is absent on the front side of the drive unit, the cartridge jumps out of the drive unit to possibly block the path of the accessor. Therefore, in general, the cartridge is allowed to be ejected only when the accessor has reached the front side of the drive unit.

If no cartridge transfer mechanism is provided between the accessor and each drive unit as mentioned above, even after completing the read/write process or the like in the drive unit, the ejection of the cartridge from the drive unit must be delayed until the accessor reaches the front side of the drive unit. As a result, an access time becomes long.

Further, drive control means for the accessor must grasp the control circumstances (completion, error, etc. of the eject operation) of drive control means for the drive unit during the control operation of the accessor, while the drive control means for the drive unit must monitor the arrival of the accessor at the front side of the drive unit in performing the eject operation. Thus, the control means in the library drive are complex.

SUMMARY OF THE INVENTION

It is therefore an object of the present invention to provide an accessor hand mechanism in a library device which is reduced in number of motors and in weight to attain a cost reduction.

It is another object of the present invention to provide an accessor hand mechanism in a library device which can realize the open/close operation of fingers, the advance/retract operation of a hand unit, and the reversing operation of a cartridge by means of a single motor.

It is still another object of the present invention to provide a library device which can reduce its installation space and realize energy saving by making the accessor hand mechanism compact.

It is still another object of the present invention to provide a library device which is reduced in size to such an extent that it can be settled under an OA desk.

It is still another object of the present invention to provide a library device which is improved in operability by locating a cartridge inlet/outlet opening and an operator panel at an upper portion of the library device.

It is a further object of the present invention to provide a library device which can quickly transfer a recording medium cartridge between an accessor and a drive unit.

In accordance with an aspect of the present invention, there is provided an accessor hand mechanism in a library device, include a base, a carrier frame rotatably mounted on the base, a pair of parallel slide shafts fixed to the carrier frame. First and second sliders are mounted on the slide shafts, and are elastically connected to each other by a connecting means. The library device is further provided with a first driving means for moving the first slider along the slide shafts. A pair of fingers each having a front end portion formed with a cartridge gripping portion, a rear end portion formed with a projection, and a pivotal portion formed intermediately between the front end portion and the rear end portion which are pivotably connected to the second slider; the pair of fingers are provided with a first biasing means for biasing the fingers in a closing direction. Additionally, the carrier frame is provided with a pair of finger open/close grooves in which projections of the fingers are respectively engaged.

Preferably, the connecting means comprises a pair of coil springs, and serves also as the first biasing means for biasing the pair of fingers in the closing direction thereof. When the first slider is moved along the slide shafts by the first driving means, the second slider is also moved in the same direction by the connecting means. The second slider is movable between an advance position and a retract position, in which the advance position comprises a first advance position and a second advance position beyond the first advance position. Owing to a special shape of each finger open/close groove, the fingers are automatically opened as the second slider is advanced.

In the retraction of the second slider after it is advanced to the first advance position, the fingers are retracted in their closed condition; whereas in the retraction of the second slider after it is advanced to the second advance position, the fingers are retracted in their open condition. The carrier frame is normally biased to rotate in one direction by second driving means connected to the same motor as that for the first driving means. The rotation of the carrier frame is prevented by a rotation preventing member abutting against the carrier frame.

While the second slider is movable between the advance position and the retract position as mentioned above, the retract position comprises a first retract position as a home position and a second retract position beyond the first retract position. Normally, the second slider is retracted to the first retract position. In the first retract position, the rotation preventing member abuts against the carrier frame to thereby prevent the rotation of the carrier frame. When the second slider is retracted to the second retract position, the abutment of the rotation preventing member against the carrier frame is canceled, so that the carrier frame is automatically rotated 180 degrees to reverse the cartridge.

Since the first slider and the second slider are connected by the elastic connecting means, the movement of the first slider is followed by the movement of the second slider. The open/close operation of the fingers is determined by the shape of the grooves in which the projections of the fingers are engaged. Accordingly, the fingers are automatically opened or closed in concert with the movement of the first and second sliders. Further, since the first driving means for moving the first slider and the second driving means for rotating the carrier frame are connected to the same motor, the open/close operation of the fingers, the movement of the first and second sliders, and the rotation of the carrier frame, that is, the reversing operation of the cartridge gripped by the fingers can be simultaneously realized by means of the single motor.

According to the accessor hand mechanism of the present invention, various operations required to be performed by the accessor, including the cartridge carrying operation for transfer of the cartridge, the cartridge gripping operation, and the cartridge side reversing operation, can be realized by means of only one motor. In case the motor is arranged in a vertical direction, the height of the accessor would be necessarily increased because a gear mechanism or the like is located at the top of the motor. According to the present invention, however, the motor is arranged in a horizontal direction, so that the length required for arrangement of the gear mechanism or the like can be absorbed within the length of the second slider of the accessor, thereby allowing the accessor to be thinned.

In accordance with another aspect of the present invention, there is provided a library device having a cartridge load/unload mechanism for loading a recording medium cartridge into the library device and unloading the cartridge from the library device, a cell unit having a plurality of cells each for containing a cartridge; a drive unit for reading and writing data from and to a recording medium contained in the cartridge the library device is further provided with an accessor for carrying the cartridge between the cartridge load/unload mechanism, the cell unit, and the drive unit. The accessor includes a base mounted movably in a vertical direction, a carrier frame rotatably mounted on the base, a pair of parallel slide shafts fixed to the carrier frame, a first slider slidably mounted on the slide shafts, a second slider slidably mounted on the slide shafts, and driving means for moving the first slider along the slide shafts. Additionally connecting means are provided for elastically connecting the first slider and the second slider. The accessor also has a pair of fingers each having a front end portion formed with a cartridge gripping portion, a rear end portion formed with a projection, and a pivotal portion formed intermediately between the front end portion and the rear end portion, and which are pivotably connected to the second slider. Biasing means are provided for biasing the pair of fingers in a closing direction. Finally, the carrier frame has a pair of finger open/close grooves adapted to engage therefor the projections of the fingers.

The cartridge load/unload mechanism is located at the uppermost portion of the library device. The accessor is constructed in a thin structure, so as to grip the cartridge loaded from the cartridge load/unload mechanism. To realize the thin structure of the accessor, the first driving means and the second driving means are connected to the same motor, and this motor is mounted so that its output shaft extends horizontally.

In accordance with a further aspect of the present invention, there is provided a library device comprising a cartridge load/unload mechanism for loading a recording medium cartridge into the library device and unloading the cartridge from the library device; a cell unit having a plurality of cells each for containing the cartridge; a drive unit for reading and writing data from and to a recording medium contained in the cartridge, the drive unit having ejecting means for ejecting the cartridge from the drive unit; an accessor for carrying the cartridge between the cartridge load/unload mechanism, the cell unit, and the drive unit; and stopper means provided in opposition of a cartridge inlet/outlet end of the drive unit, for inhibiting excess ejection of the cartridge from the drive unit, wherein in inserting the cartridge into the drive unit by means of the accessor, the stopper means is lowered to allow insertion of the cartridge into the drive unit, whereas in ejecting the cartridge from the drive unit, the stopper means comes into collision with the cartridge to stop the cartridge.

When the cartridge is forcibly ejected from the drive unit by the ejecting means, the cartridge comes into collision with the stopper means, thereby inhibiting excess ejection of the cartridge. Accordingly, irrespective of the position of the accessor, for example, even when the accessor is moving, the cartridge can be ejected from the drive unit. As a result, the cartridge can be quickly transferred between the accessor and the drive unit.

The accessor and the drive unit are respectively controlled by accessor control means and drive unit control means in an independent fashion, so that the controls of the accessor and the drive unit need not be sequentially performed, thus simplifying the controls of the accessor and the drive unit. Further, it is unnecessary to provide a cartridge transfer mechanism between the accessor and the drive unit, thereby reducing a distance between the accessor and the drive unit. Accordingly, the library device can be made compact.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 24 is a bottom plan view of a cartridge eject mechanism in a drive unit, showing the course of insertion of the cartridge into the drive unit;

DETAILED DESCRIPTION OF THE PREFERRED EMBODIMENTS

Figure 1:
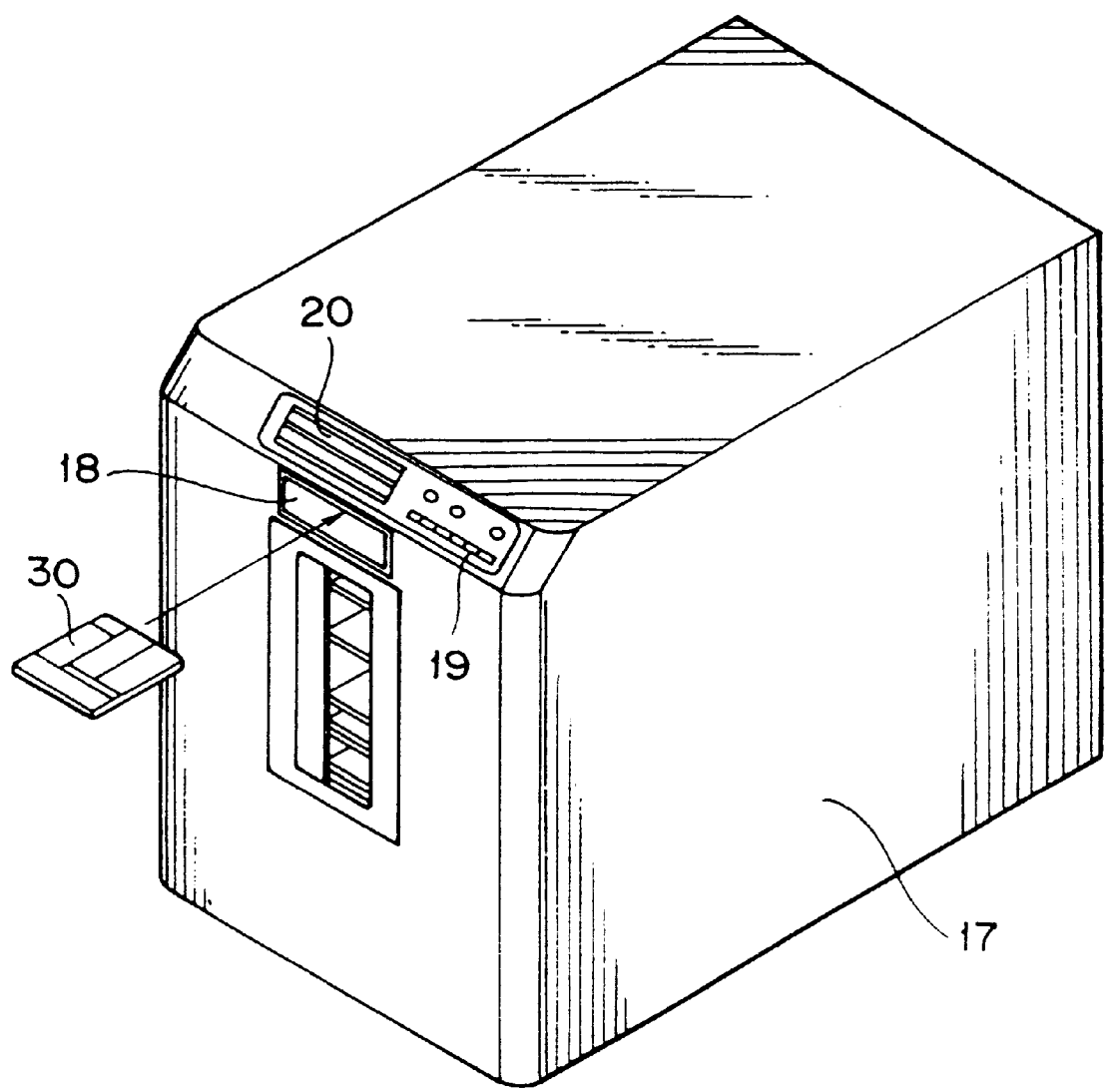
FIG. 1 is a perspective view of an optical disk library device according to a preferred embodiment of the present invention, showing the appearance thereof.

Referring first to FIG. 1, there is shown a perspective view of an optical disk library device according to a preferred embodiment of the present invention. A cartridge inlet/outlet opening 18 is formed on the front surface of a housing 17 of the library device. A plurality of LEDs 19 and an LCD panel 20 are provided near the cartridge inlet/outlet opening 18. An optical disk cartridge 30 is inserted from the cartridge inlet/outlet opening 18 into the library device. The cartridge inlet/outlet opening 18 and the LCD panel 20 are located at the uppermost portion of the library device, so that the operability to the library device settled under an OA desk can be improved.

Figure 2:
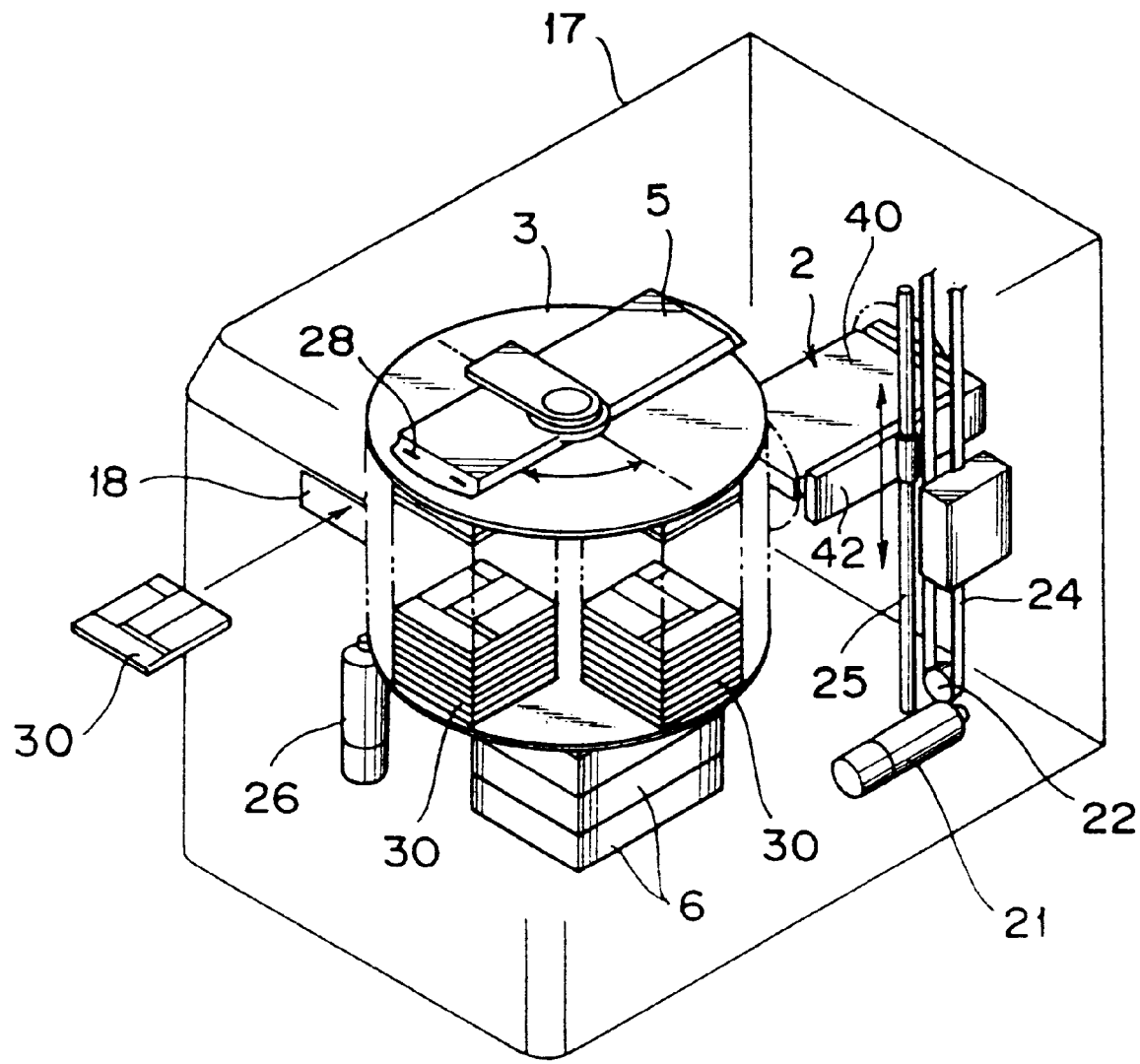
FIG. 2 is a perspective view of the optical disk library device, showing the internal structure thereof.
Figure 3:
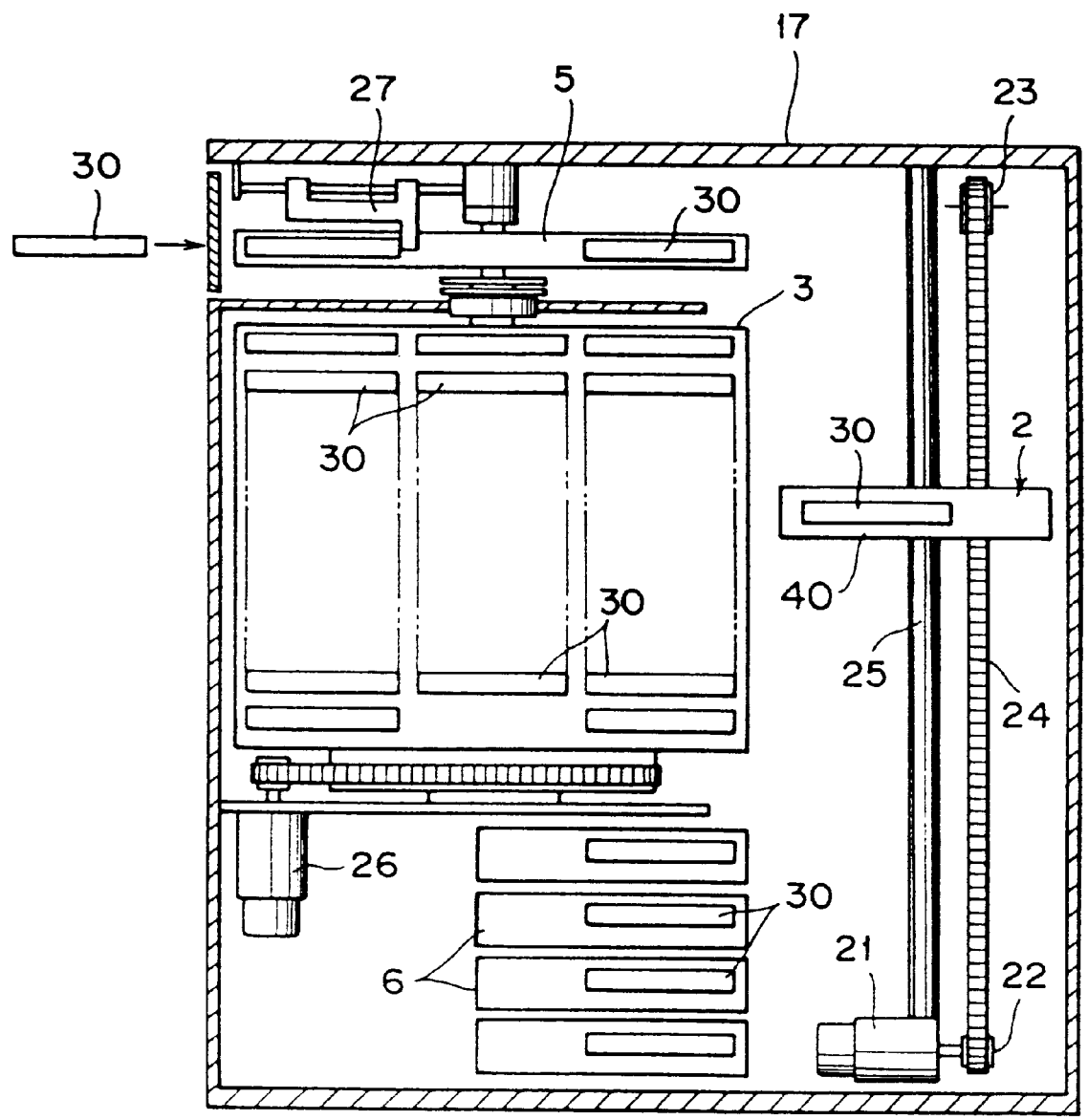
FIG. 3 is a vertical sectional view of the optical disk library device.

Referring to FIGS. 2 and 3, a cell drum 3 having a plurality of cells and a cartridge access station 5 are rotatably enclosed in the housing 17. The cell drum 3 and the cartridge access station 5 are coaxially arranged, and they are rotated together by a motor 26 with a rotary encoder. Further enclosed in the housing 17 are a plurality of optical disk drive units 6 and an accessor 2 for carrying the cartridge 30 between the cell drum 3, the cartridge access station 5, and the drive units 6.

Each of the drive units 6 is a standard 5" type optical disk drive. Therefore, the drive units 6 can access or play both sides of an optical disk medium contained in the cartridge 30. The cartridge 30 is a type of ISO 10089 cartridge.

The cartridge access station 5 includes a housing having two openings. The cartridge 30 is inserted into the housing of the access station 5 through the opening 18 of the housing 17 when the first opening of the station 5 is faced to the opening 18. At this time, the second opening of the station 5 is faced to the accessor 2 so that a cartridge can be loaded to or unloaded from the accessor 2.

A timing belt 24 is wrapped between a pulley 22 fixed to an output shaft of a motor 21 with a rotary encoder and a pulley 23 rotatably mounted to the housing 17. A holder bracket 42 is fixed to the timing belt 24, and a hand unit 40 of the accessor 2 is mounted on the holder bracket 42. When the motor 21 is driven, the hand unit 40 is vertically moved along a guide shaft 25. The cell drum 3 has a plurality of cells, and each cell is designed to contain the single optical disk cartridge 30; however, a specific one of the cells is used to contain a cleaning cartridge for cleaning an optical head of each drive unit 6.

The cartridge access station 5 functions to carry the optical disk cartridge 30 inserted from the cartridge inlet/outlet opening 18 into the library device by an operator to a transfer position where the cartridge 30 is transferred to the accessor 2, or to receive the cartridge 30 used from the accessor 2 and carry it to a given position where the cartridge 30 is ejected from the cartridge inlet/outlet opening 18. The cartridge access station 5 is provided with an ID hole sensor 28 such as a transmission type photosensor to detect a cleaning cartridge put into the cartridge access station 5.

The accessor 2, as described later, has a side reversing mechanism which can reverse the side of the optical disk cartridge 30. Therefore, the operator can insert the cartridge 30 into the housing of the cartridge access station 5 without caring of the sides of the optical disk cartridge 30. After inserting the cartridge 30, the accessor 2, if necessary, reverses the side of the cartridge 30 in accordance with a control signal and then inserts the cartridge 30 into a specified disk drive unit 6.

The plural LEDs 19 indicate various states of the library device (e.g., powered state, on-line state, and busy state) and give warnings. The LCD panel 20 displays various messages including the course of head cleaning, the time for replacement of the cleaning cartridge, etc. When the operator inserts the optical disk cartridge 30 from the cartridge inlet/outlet opening 18, the cartridge 30 comes into abutment against a stopper 27 of the cartridge access station 5.

When the motor 26 is driven, the cartridge access station 5 is rotated 180° together with the cell drum 3 to transfer the cartridge 30 to the accessor 2. When receiving the cartridge 30, the accessor 2 carries the cartridge 30 to insert it into a specified one of the cells in the cell drum 3. In reading or writing data from or to the optical disk contained in the optical disk cartridge 30, the accessor 2 takes the cartridge 30 out of a specified one of the cells in the cell drum 3 and carries the cartridge 30 to insert it into a specified one of the drive units 6.

After completing the reading or writing of data from or to the optical disk in the optical disk cartridge 30, the accessor 2 takes the cartridge 30 out of the specified drive unit 6 and carries the cartridge 30 to insert it into the specified cell in the cell drum 3. In ejecting the optical disk cartridge 30 used out of the library device, the accessor 2 takes the cartridge 30 out of a specified one of the cells in the cell drum 3 and transfer it to the cartridge access station 5. Then, the motor 26 is driven to rotate 180° the cartridge access station 5, and the cartridge 30 is then ejected from the cartridge inlet/outlet opening 18.

Figure 8:
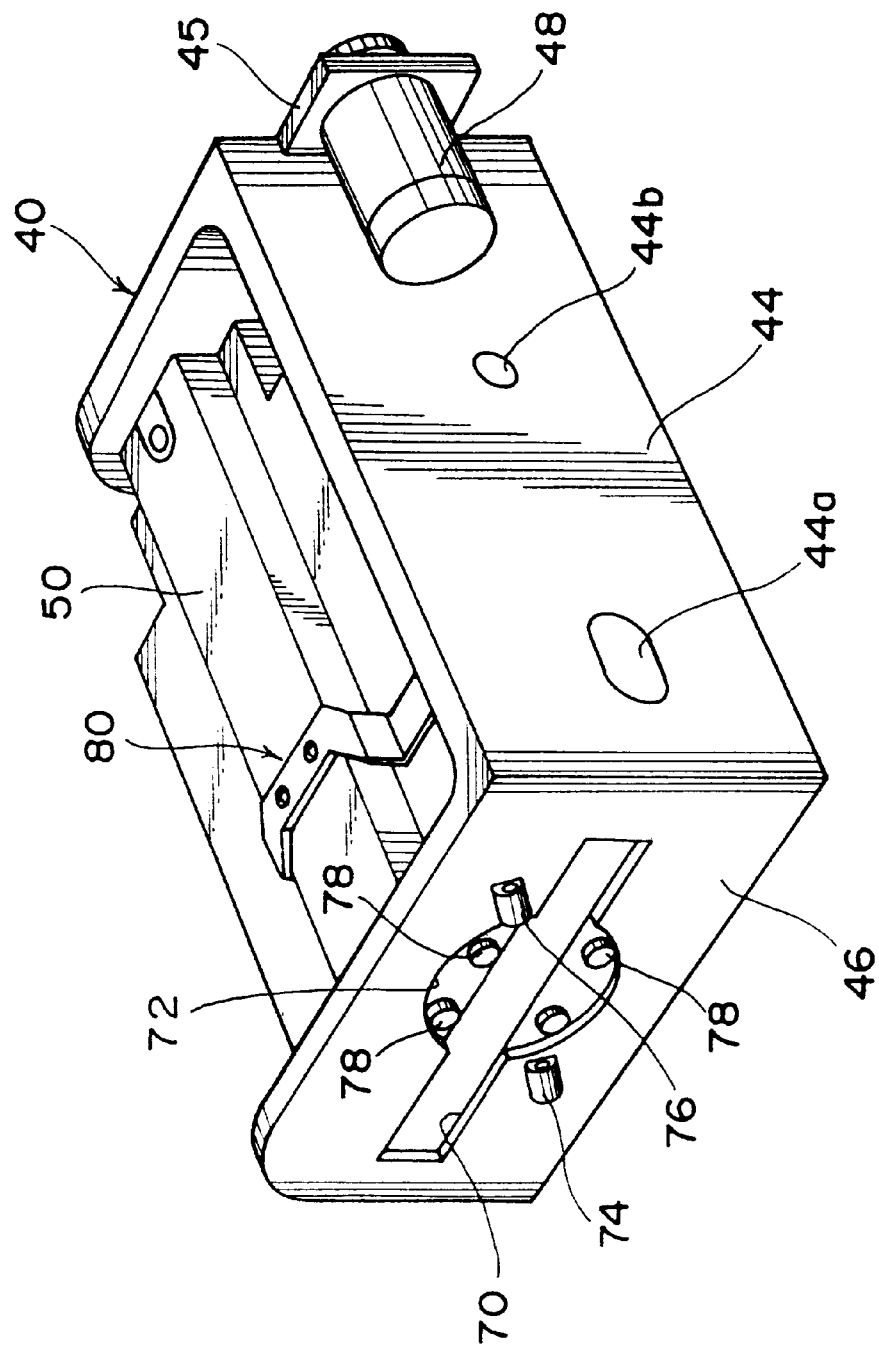
FIG. 8 is a perspective view of a hand unit as viewed from the front side thereof.
Figure 9:
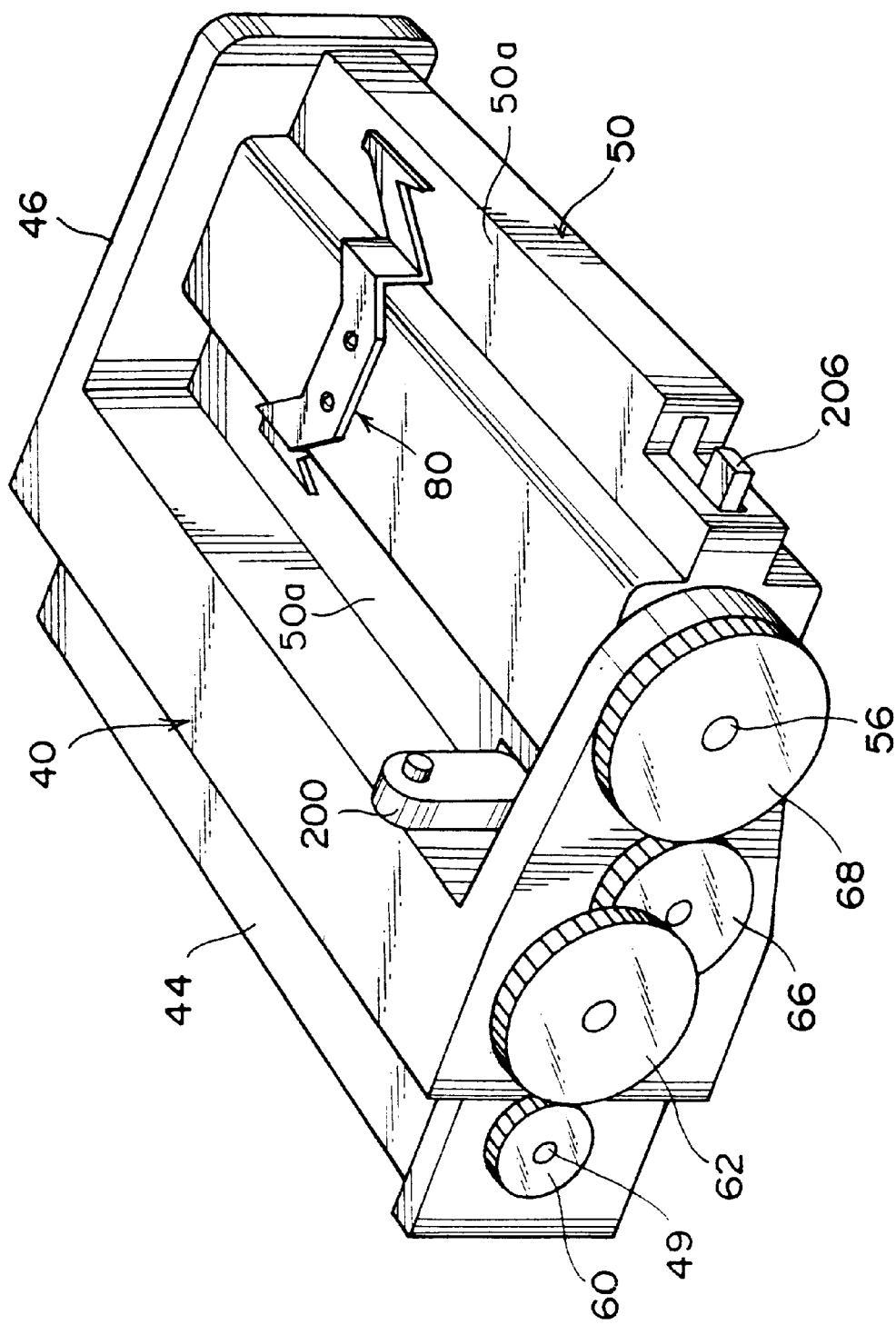
FIG. 9 is a perspective view of the hand unit as viewed from the rear side thereof.

The accessor hand unit 40 will now be generally described with reference to FIGS. 4 to 6, 8, and 9. Referring first to FIGS. 8 and 9, a carrier frame 50 is rotatably mounted on a base 44 of the hand unit 40 of the accessor 2. The base 44 is integrally formed with a front panel 46. The base 44 has holes 44a and 44b for positioning the hand unit 40 to the holder bracket 42. The front panel 46 has a rectangular opening 70 allowing passage of the optical disk cartridge 30 and a circular opening 72 formed at a substantially central portion of the rectangular opening 70.

The front end of the carrier frame 50 is formed with a rectangular opening similar to the rectangular opening 70 of the front panel 46. A plurality of rollers 78 rolling in contact with the circular opening 72 of the front panel 46 are mounted on the front end of the carrier frame 50. By the rolling of the rollers 78 along the circular opening 72, the carrier frame 50 is rotatably supported at its front end to the base 44. Further, an LED 74 and a photodetector 76 are mounted on the front panel 46 at opposed positions as shown in FIG. 8. That is, the LED 74 and the photodetector 76 are mounted on the front panel 46 in such a manner that a light beam emitted from the LED 74 passes a substantially central position of the circular opening 72.

Figure 4:
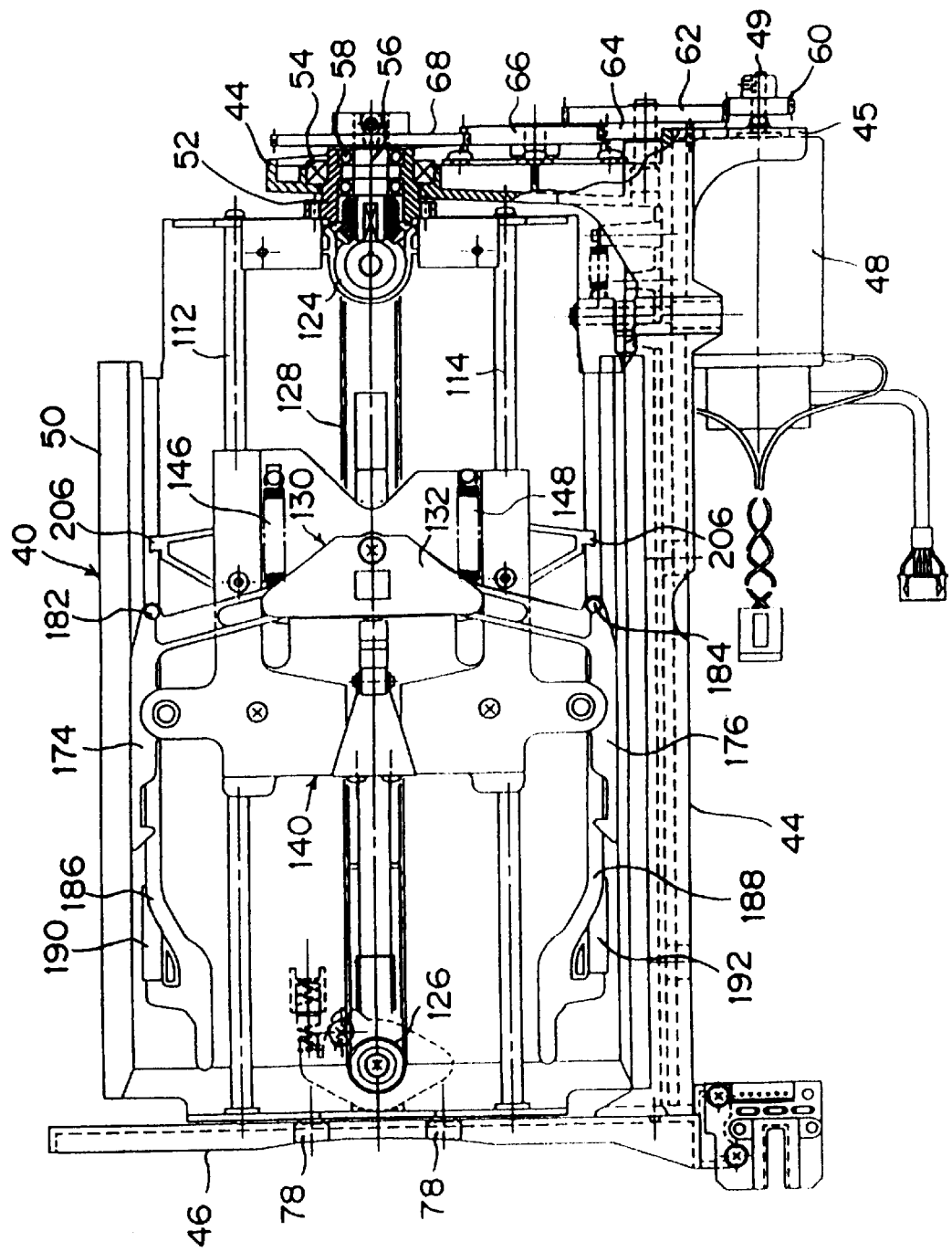
FIG. 4 is a top plan view of an accessor hand mechanism.
Figure 5:
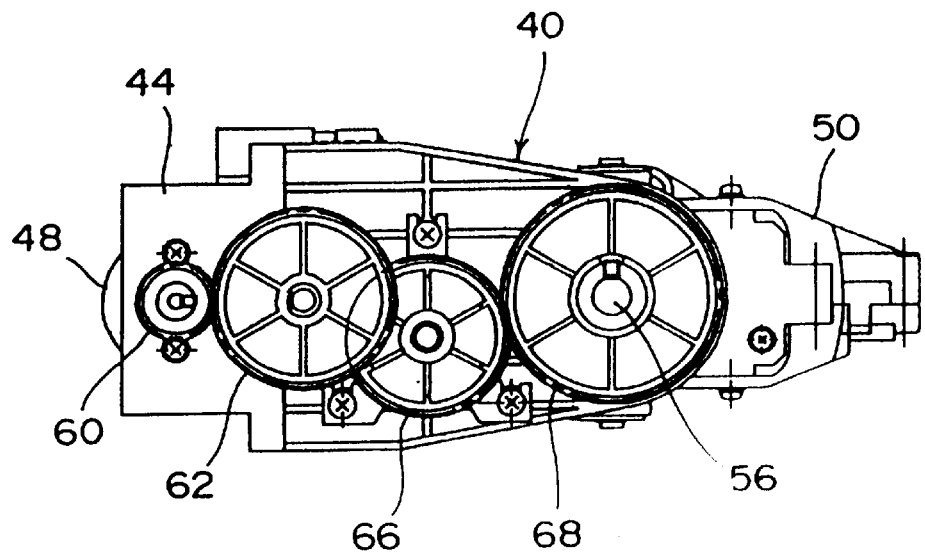
FIG. 5 is a right side view of FIG. 4.
Figure 6:
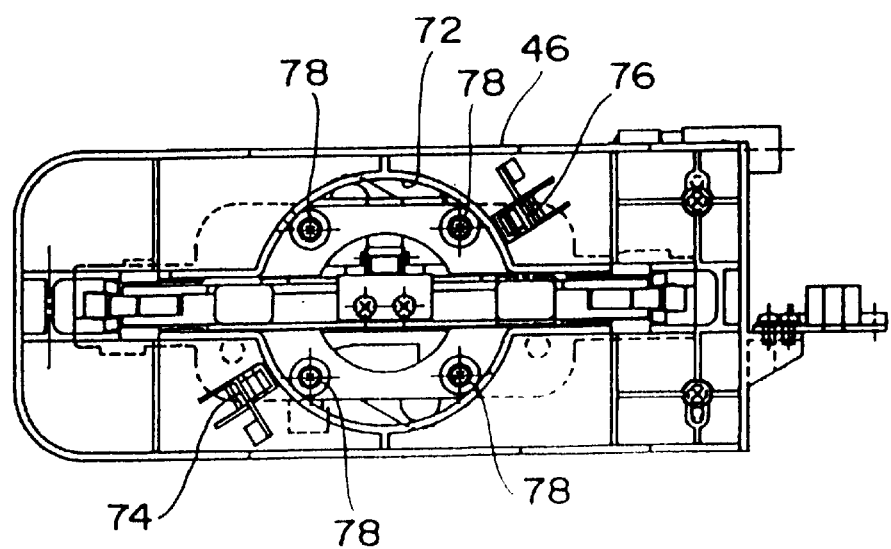
FIG. 6 is a left side view of FIG. 4.

As best shown in FIG. 4, a motor 48 with a rotary encoder is mounted on a bracket 45 of the base 44. A gear 60 is fixed to a horizontally extending output shaft 49 of the motor 48, and the gear 60 meshes with a gear 62. A gear 64 fixed to the same shaft as that of the gear 62 meshes with a gear 66. The gear 66 meshes with a gear 68 fixed to a shaft 56.

Figure 21:
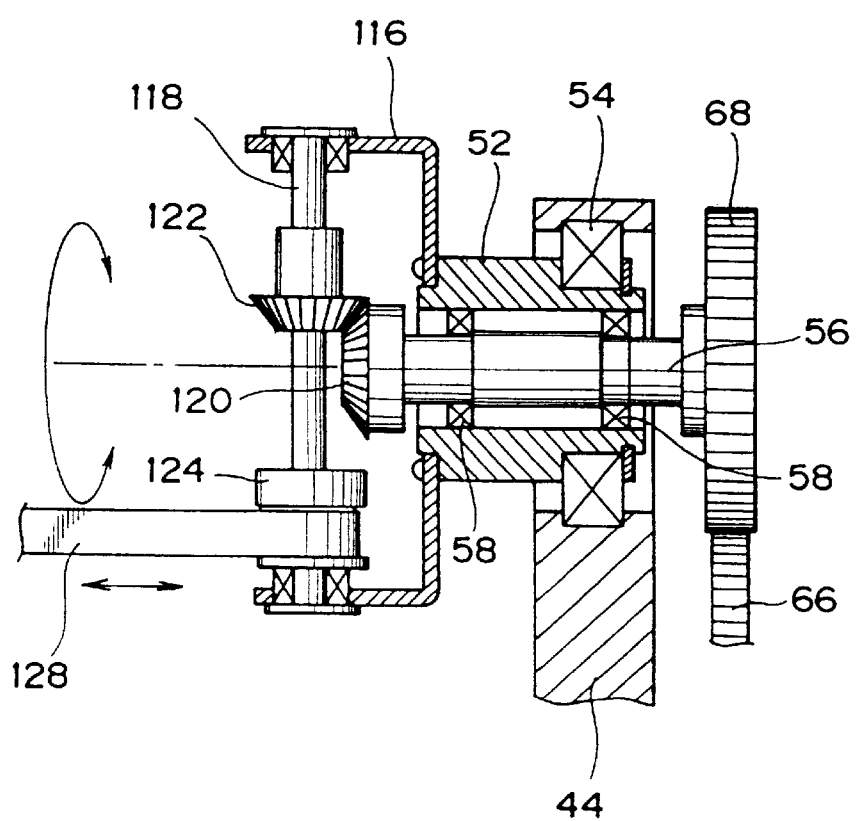
FIG. 21 is a sectional view showing a double-shaft structure of the hand unit.

As apparent from FIGS. 4 and 21 in combination, the carrier frame 50 is rotatably supported at its rear end to the base 44 by means of a double-shaft structure. That is, a hollow cylindrical member of sleeve 52 is rotatably supported through a bearing 54 to the base 44, and the sleeve 52 is fixed at its one end to the carrier frame 50. The shaft 56 is inserted in the sleeve 52, and is rotatably supported by a pair of bearings 58. In this manner, the carrier frame 50 is rotatably supported at its front end to the base 44 by the contact of the rollers 78 with the circular opening 72, and is rotatably supported at its rear end to the base 44 by the double-shaft structure, thus securing a stable support of the carrier frame 50 to the base 44.

Referring again to FIGS. 8 and 9, a one-way guide unit 80 to be hereinafter described in detail is mounted on the carrier frame 50. A rotation preventing member 200 for preventing rotation of the carrier frame 50 is pivotably mounted to the base 44 as will be hereinafter described in detail.

Figure 10:
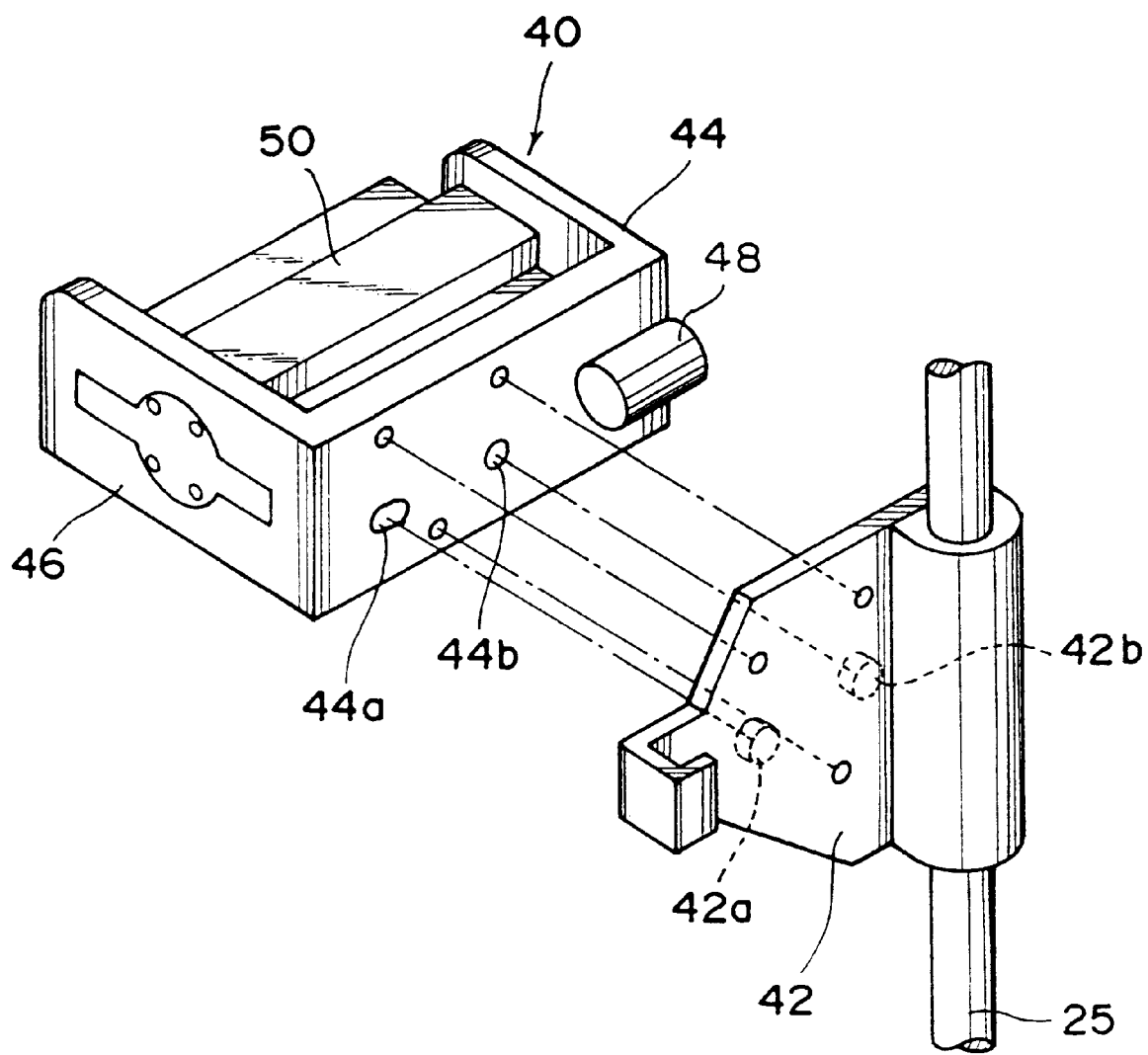
FIG. 10 is an exploded perspective view illustrating the replacement of the hand unit.

Referring to FIG. 10, the holder bracket 42 slidably supported to the guide shaft 25 has two projections 42a and 42b. The projections 42a and 42b of the holder bracket 42 are inserted into the holes 44a and 44b of the base 44, thereby positioning the hand unit 40. Then, the hand unit 40 is fixed to the holder bracket 42 by screws. In this manner, the hand unit 40 is separatable from the guide shaft 25, thereby facilitating the replacement of the hand unit 40.

Figure 11:
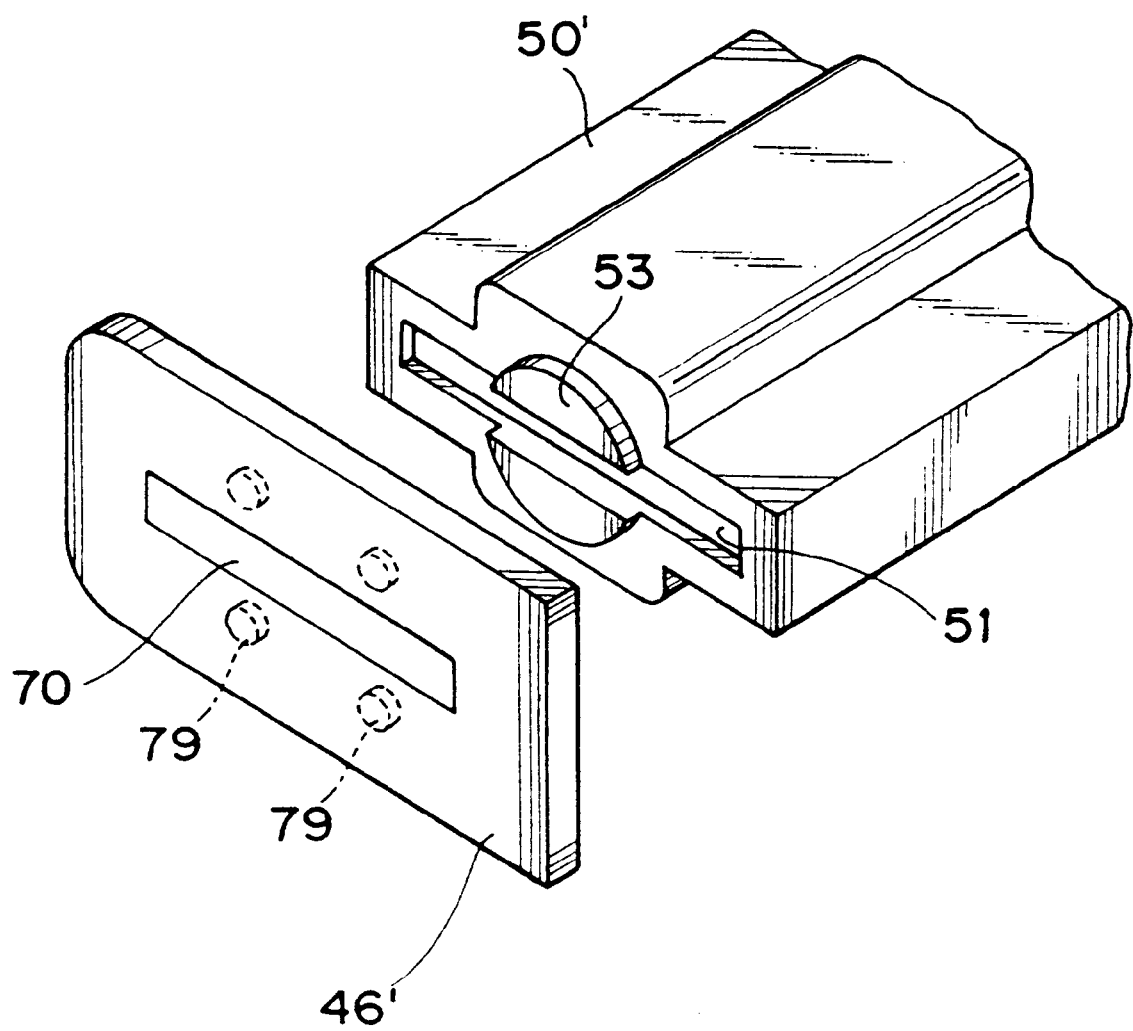
FIG. 11 is an exploded perspective view showing another preferred embodiment of a carrier frame and a front panel.

Referring to FIG. 11, there is shown another preferred embodiment of the carrier frame 50 and the front panel 46. In this embodiment, the front end of a carrier frame 50' is formed with a rectangular opening 51 allowing passage of the cartridge 30, and is further formed with a circular opening 53 at a substantially central portion of the rectangular opening 51. A front panel 46' of a base not shown in FIG. 11 has a rectangular opening 70 corresponding to the rectangular opening 51 and a plurality of rollers 79 rolling along the circular opening 53. By the rolling of the rollers 79 mounted on the front panel 46' along the circular opening 53 formed through the front end of the carrier frame 50', the carrier frame 50' is rotatably supported at its front end to the base.

Figure 7:
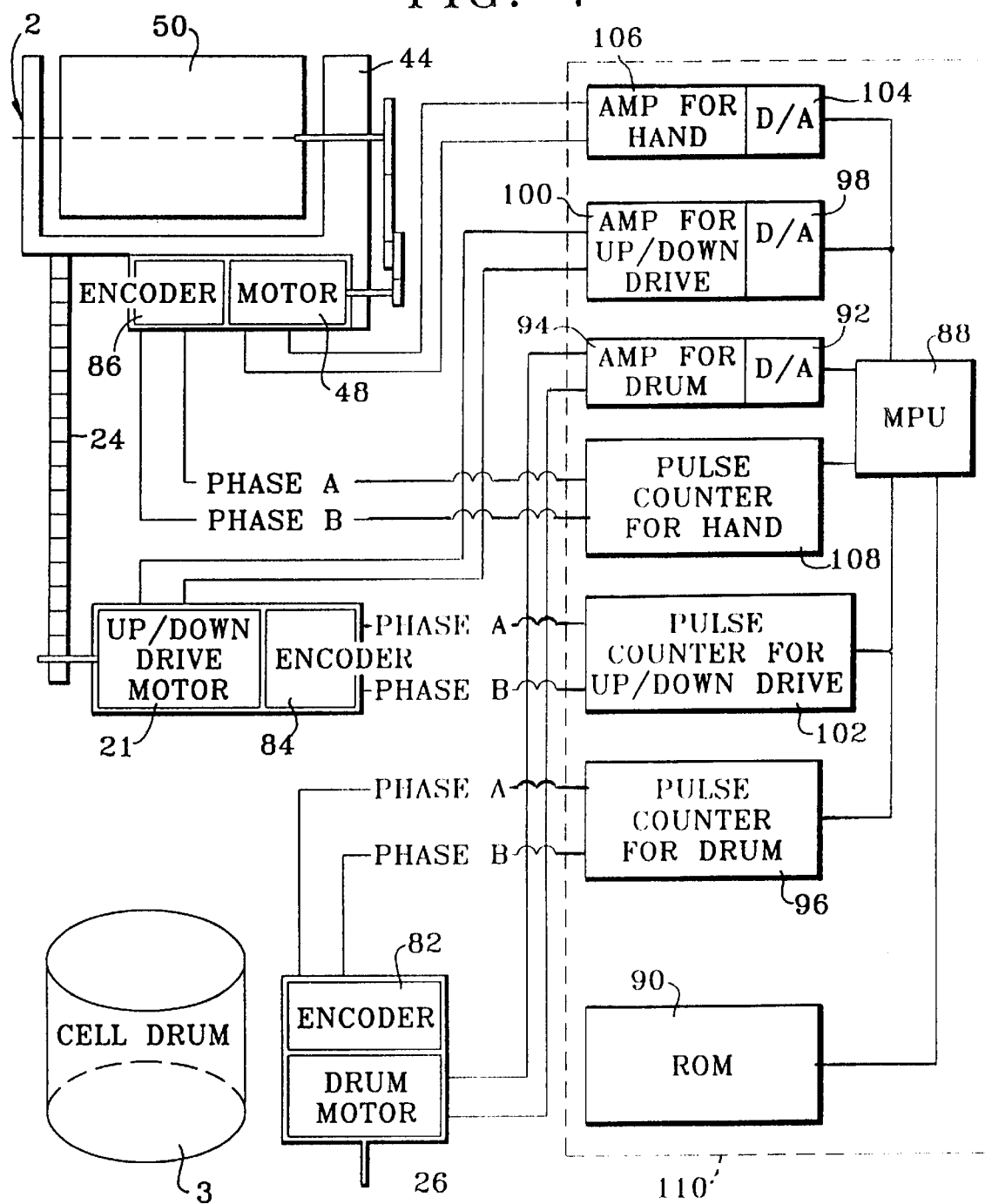
FIG. 7 is a block diagram of an accessor control system.

A control system for the accessor 2 will now be described, in brief, with reference to FIG. 7. An accessor controller 110 includes an MPU 88, a ROM 90 having control firmware, a plurality of D/A converters 92, 98, and 104, a plurality of amplifiers 94, 100, and 106, and a plurality of pulse counters 96, 102, and 108.

A rotational angle of the drum motor 26 is detected by an encoder 82. For example, the encoder 82 outputs 200 pulses per revolution of the motor 26. The pulses output from the encoder 82 are counted by the drum pulse counter 96, and the count value is input into the MPU 88. Similarly, the output pulses from encoders 84 and 86 for detecting rotational angles of the motors 21 and 48 are counted by the pulse counter 102 for hand unit up/down movement and the pulse counter 108 for hand unit drive, respectively, and the respective count values are input into the MPU 88.

An accessor hand mechanism will now be described in detail with reference to FIGS. 4, 12, 13, and 14. As shown in FIG. 4, a pair of parallel slide shafts 112 and 114 are mounted to the carrier frame 50. A first slider 130 and a second slider 140 are slidably mounted on the slide shafts 112 and 114. As apparent from FIG. 14, the first slider 130 is slidably mounted on the slide shaft 114 at two mounting portions 158 and 160, and is loosely mounted on the slide shaft 112 at one mounting portion 162.

Figure 19A:
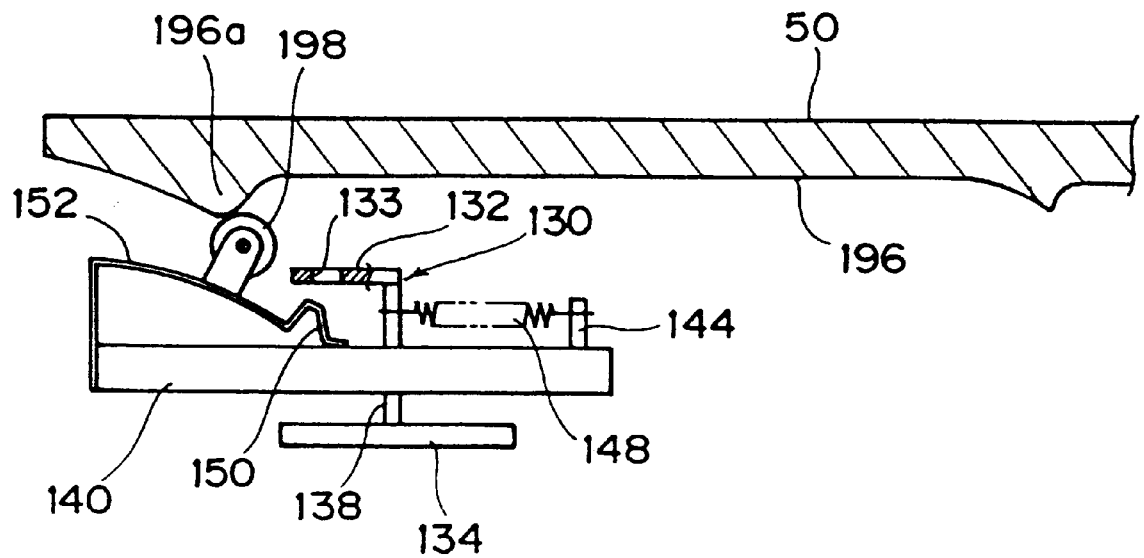
FIGS. 19A and 19B are side views illustrating a finger open/close timing.
Figure 19B:
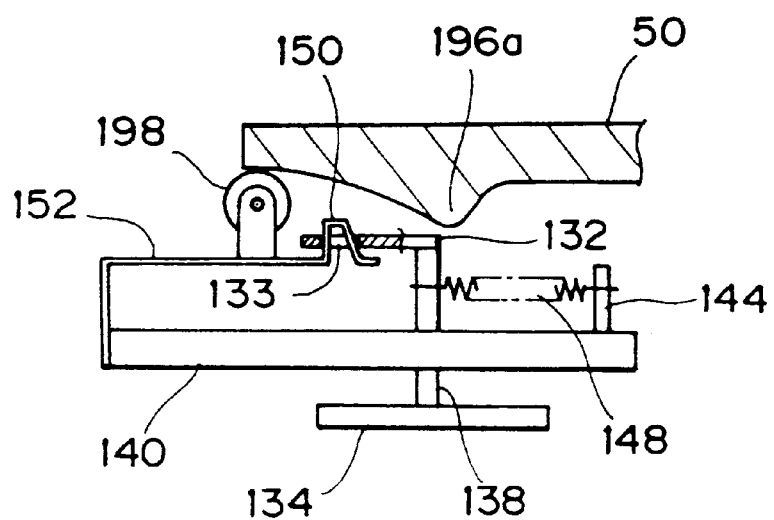

Similarly, the second slider 140 is slidably mounted on the slide shaft 112 at two mounting portions 164 and 166, and is loosely mounted on the slide shaft 114 at one mounting portion 168. As best shown in FIGS. 19A and 19B, the first slider 130 is composed of an upper plate 132, a lower plate 134, and a pair of shafts 136 and 138 connecting the upper plate 132 and the lower plate 134.

Figure 14:
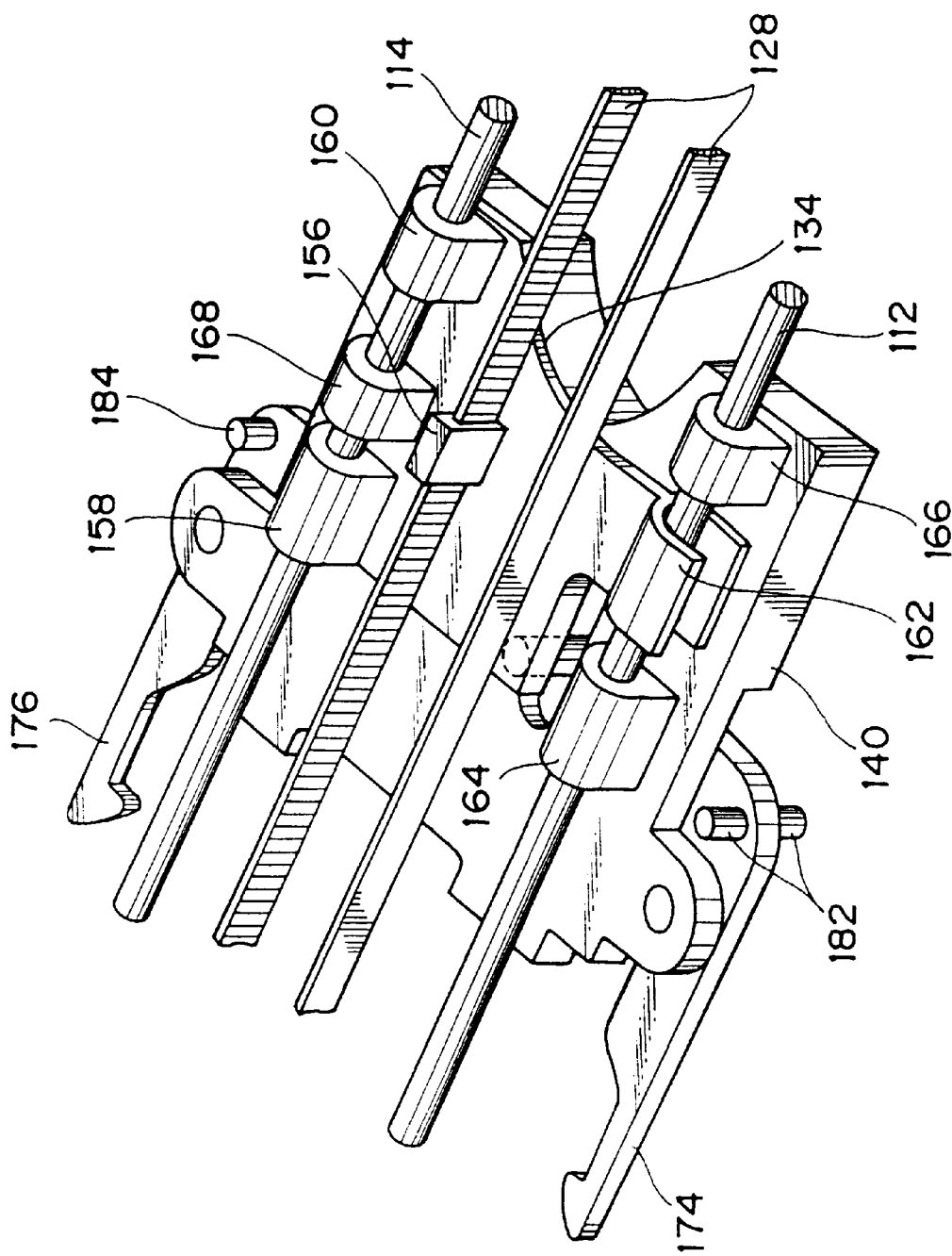
FIG. 14 is a perspective view of the hand mechanism as viewed from the bottom side thereof.

As apparent from FIG. 14, the lower plate 134 of the first slider 130 is connected by a connecting member 156 to a timing belt 128 which is driven by the motor 48. The second slider 140 has a pair of elongated holes 141 and 143, and the shafts 136 and 138 are inserted through the elongated holes 141 and 143, respectively. A pair of projections 142 and 144 are formed on the rear end portion of the second slider 140, and a pair of coil springs 146 and 148 extend to connect the shafts 136 and 138 and the projections 142 and 144, respectively. Accordingly, the first slider 130 and the second slider 140 are elastically connected together by the coil springs 146 and 148.

Referring to FIGS. 4 and 21, the timing belt 128 is wrapped between pulleys 124 and 126. The torque of the motor 48 is transmitted through the gears 60, 62, 64, 66, and 68 to the shaft 56. When the shaft 56 is rotated, a shaft 118 is rotated through bevel gears 120 and 122. At the same time, the carrier frame 50 connected to a sheet metal frame 116 is rotated about a horizontal axis because the sheet metal frame 116 is rotatably supported by the sleeve 52 and the bearing 54. That is, the carrier frame 50 is biased to rotate in one direction.

The pulley 124 is fixed to the shaft 118, so that the timing belt 128 is rotationally driven to thereby slide the first slider 130 along the slide shafts 112 and 114. Since the second slider 140 is elastically connected to the first slider 130 by the coil springs 146 and 148, the second slider 140 is also slid in the same direction as that of the first slider 130 so as to follow the first slider 130.

Figure 13:
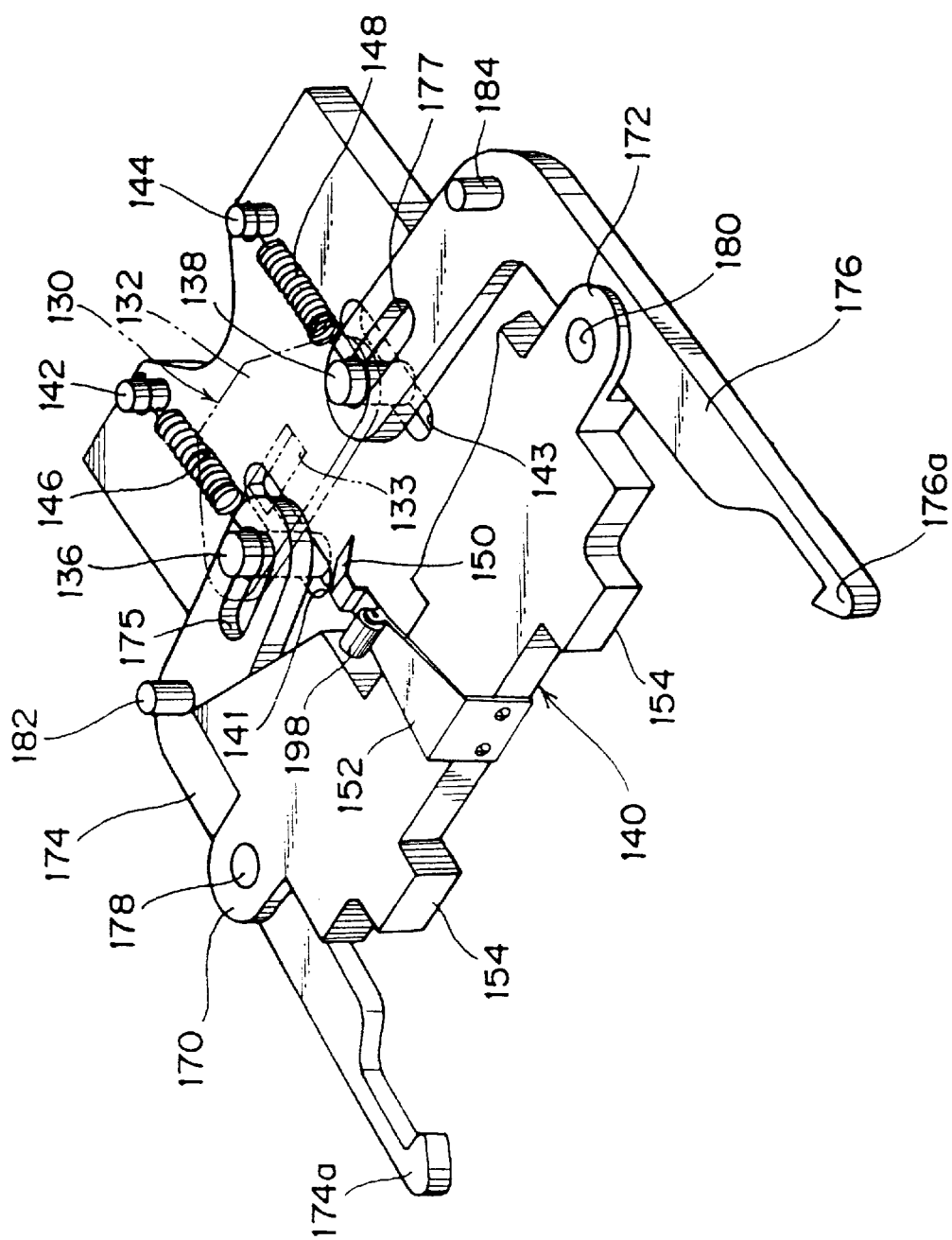
FIG. 13 is an enlarged perspective view of part of the hand mechanism shown in FIG. 12.

A pair of side projections 170 and 172 are formed on the opposite sides of the second slider 140. The side projections 170 and 172 are formed with holes, and shafts 178 and 180 are inserted through the holes of the side projections 170 and 172, respectively, thereby pivotably mounting a pair of fingers 174 and 176 to the second slider 140. The fingers 174 and 176 have cartridge grip portions 174a and 176a at the respective front ends, and also have projections 182 and 184 at the positions opposite to the cartridge grip portions 174a and 176a with respect to the pivot shafts 178 and 180, respectively. As best shown in FIG. 13, the fingers 174 and 176 are formed at their respective rear end portions with elongated holes 175 and 177, and the shafts 136 and 138 of the first slider 130 are inserted in the elongated holes 175 and 177.

Figure 15:
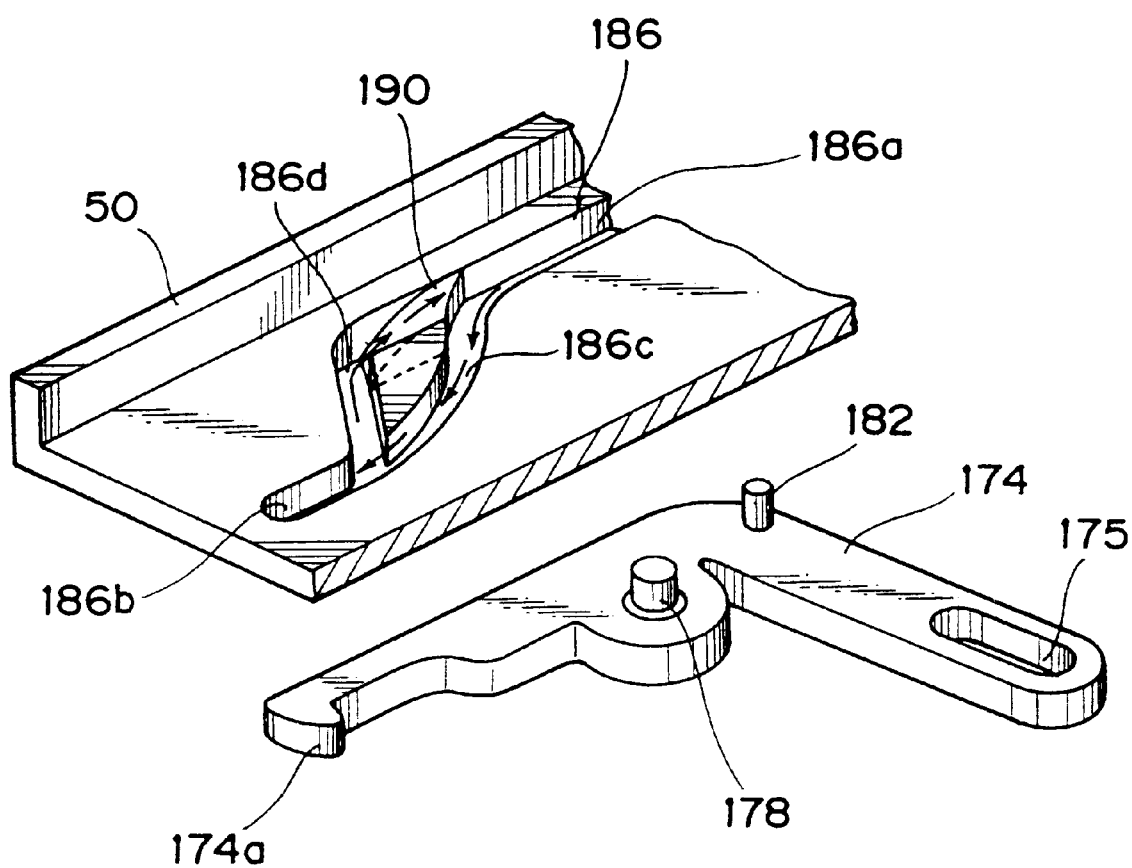
FIG. 15 is a perspective view illustrating the relation between a guide groove of a carrier frame and a projection of a finger.

Referring to FIGS. 4 and 15, the carrier frame 50 is formed with a pair of finger open/close grooves 186 and 188 in which the projections 182 and 184 of the fingers 174 and 176 are engaged. As apparent from FIG. 14, the projections 182 and 184 of the fingers 174 and 176 project upward and downward from the upper and lower surfaces of the fingers 174 and 176. Accordingly, the finger open/close grooves 186 and 188 are also formed on the upper and lower inner surfaces of the carrier frame 50.

As shown in FIG. 15, the groove 186 includes a first portion 186a extending in the longitudinal direction of the carrier frame 50, a second portion 186b formed near the front end of the carrier frame 50, a third portion 186c connecting the first portion 186a and the second portion 186b, and a fourth portion 186d similarly connecting the first portion 186a and the second portion 186b but formed laterally outside of the third portion 186c.

Figure 16A:
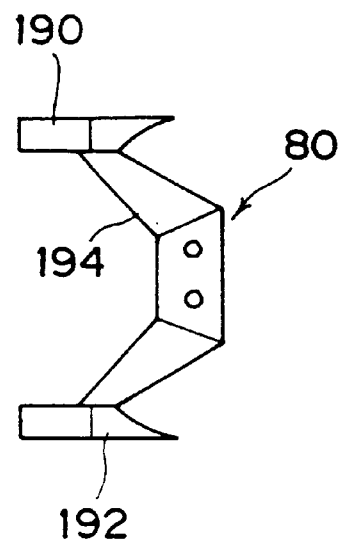
FIGS. 16A to 16C are views showing one-way guides.

As apparent from FIG. 4, the groove 188 also includes first to fourth portions similar to the first to fourth portions 186a to 186d of the groove 186, and the groove 188 is formed on the carrier frame 50 in symmetrical relationship with the groove 186. The fingers 174 and 176 are slidably mounted on the second slider 140 in the condition that the projections 182 and 184 are engaged with the grooves 186 and 188, respectively. As apparent from FIGS. 4 and 15, one-way guides 190 and 192 are inserted in the fourth portions of the grooves 186 and 188, respectively. As shown in FIG. 16A, the one-way guides 190 and 192 are connected together by a connecting member 194 having elasticity, thus forming the one-way guide unit 80. The one-way guide unit 80 is formed from a resin molding.

Figure 16B:
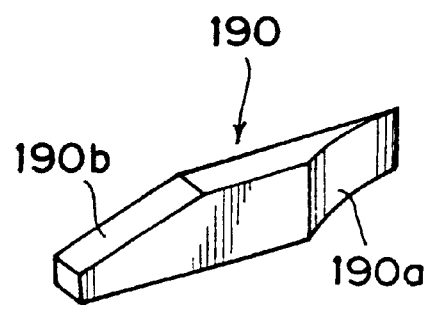
Figure 16C:
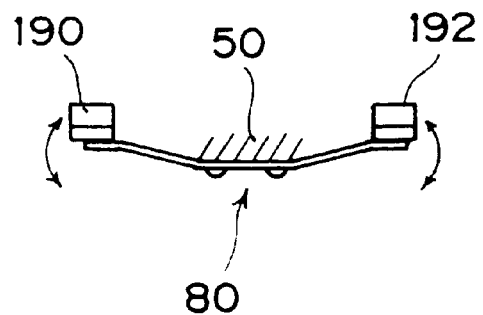

As shown in FIG. 16B, the one-way guide 190 has an arcuate guide surface 190a and an inclined surface 190b. The one-way guide 192 also has a similar arcuate guide surface and a similar inclined surface. As shown in FIG. 15, the one-way guide 190 is disposed in the groove 186 so that the arcuate guide surface 190a guides the projection 182 of the finger 174 from the first portion 186a to the third portion 186c of the groove 186. Similarly, the one-way guide 192 is disposed in the groove 188 so that the arcuate guide surface guides the projection 184 of the finger 176 from the first portion to the third portion of the groove 188. As shown in FIG. 16C, when the projections 182 and 184 of the fingers 174 and 176 rise along the inclined surfaces of the one-way guides 190 and 192, the one-way guides 190 and 192 are vertically displaced because of the elasticity of the connecting member 194 of the one-way guide unit 80.

Figure 17A:
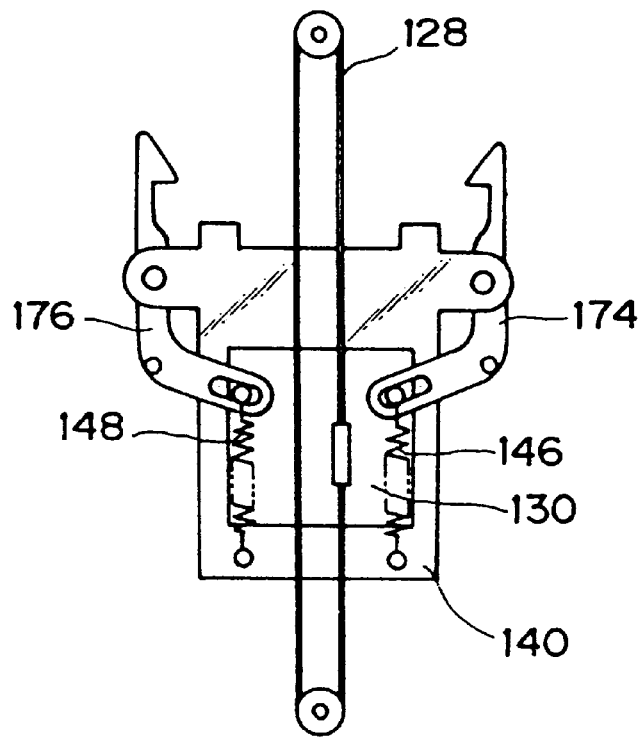
FIGS. 17A and 17B are plan views illustrating a finger open/close operation.

As shown in FIG. 17A, the fingers 174 and 176 are normally biased to be closed by the tensile coil springs 146 and 148. The first slider 130 and the second slider 140 are connected together by the tensile coil springs 146 and 148, so that when the first slider 130 is advanced by rotation of the timing belt 128, the second slider 140 is also advanced to follow the first slider 130 with some delay. Such a phase difference in sliding between the first slider 130 and the second slider 140 and the shape of the finger open/close grooves 186 and 188 determine a finger open/close angle.

Figure 17B:
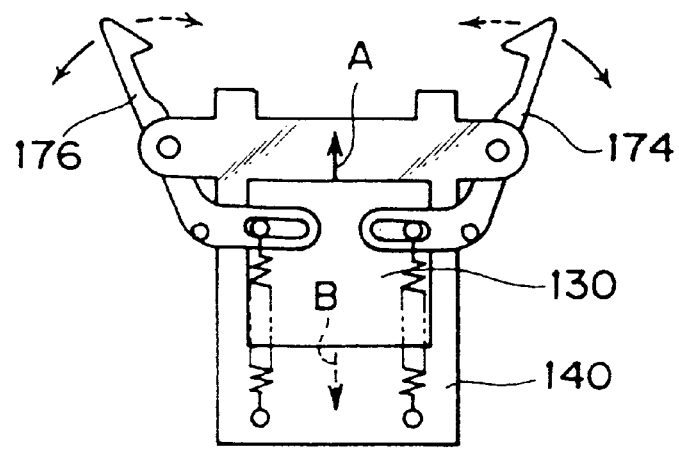
Figure 18A:
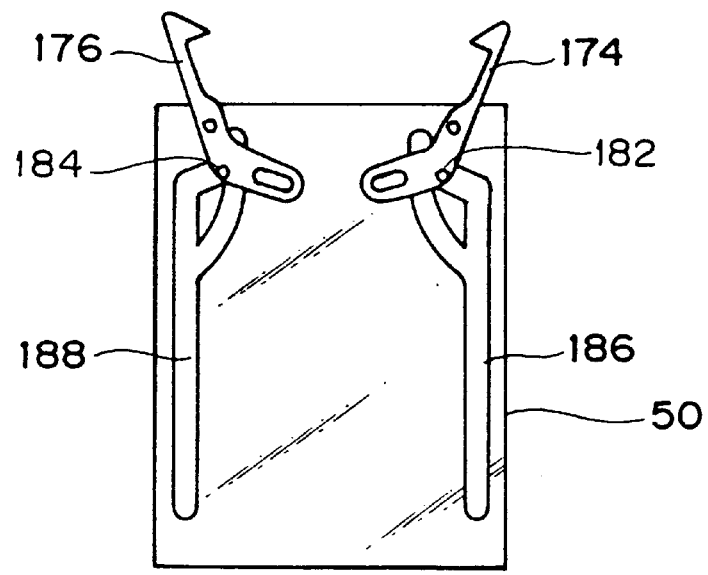
FIGS. 18A to 18C are plan views illustrating the relation between the finger open/close operation and a manner of movement of the projection of the finger in the guide groove.

As shown in FIG. 17B, when the sliders 130 and 140 are advanced as shown by an arrow A, the fingers 174 and 176 are opened, whereas when the sliders 130 and 140 are retracted as shown by an arrow B, the fingers 174 and 176 are closed. Such an open/close operation of the fingers 174 and 176 is determined by an advance position of the second slider 140. The open/close operation of the fingers 174 and 176 will now be described in detail with reference to FIGS. 18A to 18C. As shown in FIG. 18A, the fingers 174 and 176 are moved in the condition where the projections 182 and 184 are engaged with the grooves 186 and 188, respectively.

Figure 18B:
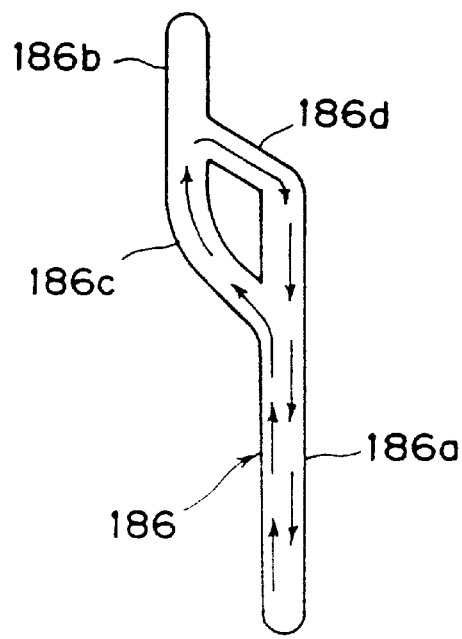

As shown in FIG. 18B, when the projection 182 of the finger 174 is advanced to a position near a connecting portion between the second portion 186b and the fourth portion 186d of the groove 186, and is then retracted, that is, when the second slider 140 is moved to a first advance position, and is then retracted, the fingers 174 and 176 are advanced in their open condition and is then retracted in their closed condition. More specifically, as apparent from FIGS. 18B and 15 in combination, when the second slider 140 is advanced, the projection 182 of the finger 174 is guided by the one-way guide 190 to advance from the first portion 186a to the third portion 186c of the groove 186. As a result, the fingers 174 and 176 are opened and advanced against the biasing forces of the coil springs 146 and 148.

On the other hand, when the second slider 140 is retracted, the projection 182 of the finger 174 is urged to pass the fourth portion 186d of the groove 186 by the action of the coil spring 146. As a result, the fingers 174 and 176 are closed and retracted. During the retraction of the finger 174, the one-way guide 190 is pressed by the projection 182 of the finger 174 to escape and therefore allow the pass of the projection 182 through the fourth portion 186d. The relation between the projection 184 of the finger 176 and the one-way guide 192 is similar to the above.

Figure 18C:
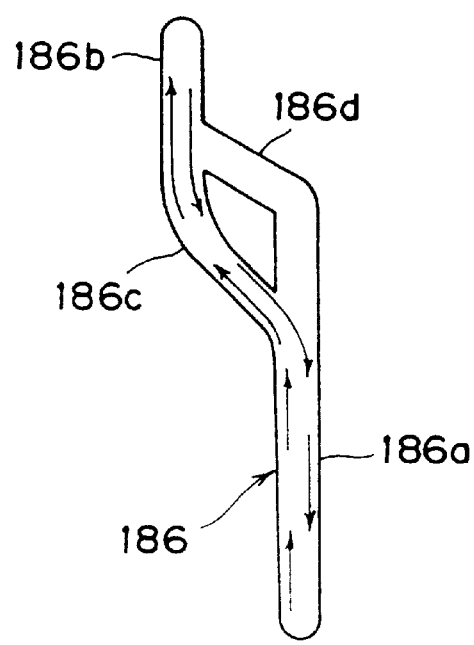

In contrast, as shown in FIG. 18C, when the projection 182 of the finger 174 is advanced to the second portion 186b of the groove 186, and is then retracted, that is, when the second slider 140 is advanced to a second advance position beyond the first advance position, and is then retracted, the projection 182 of the finger 174 is moved in the groove 186 so as to take the route shown by arrows in FIG. 18C. Accordingly, the fingers 174 and 176 are advanced in their open condition, and are then retracted in their open condition until reaching a given position. After passing the given position, the fingers 174 and 176 are retracted in their closed condition.

Figure 12:
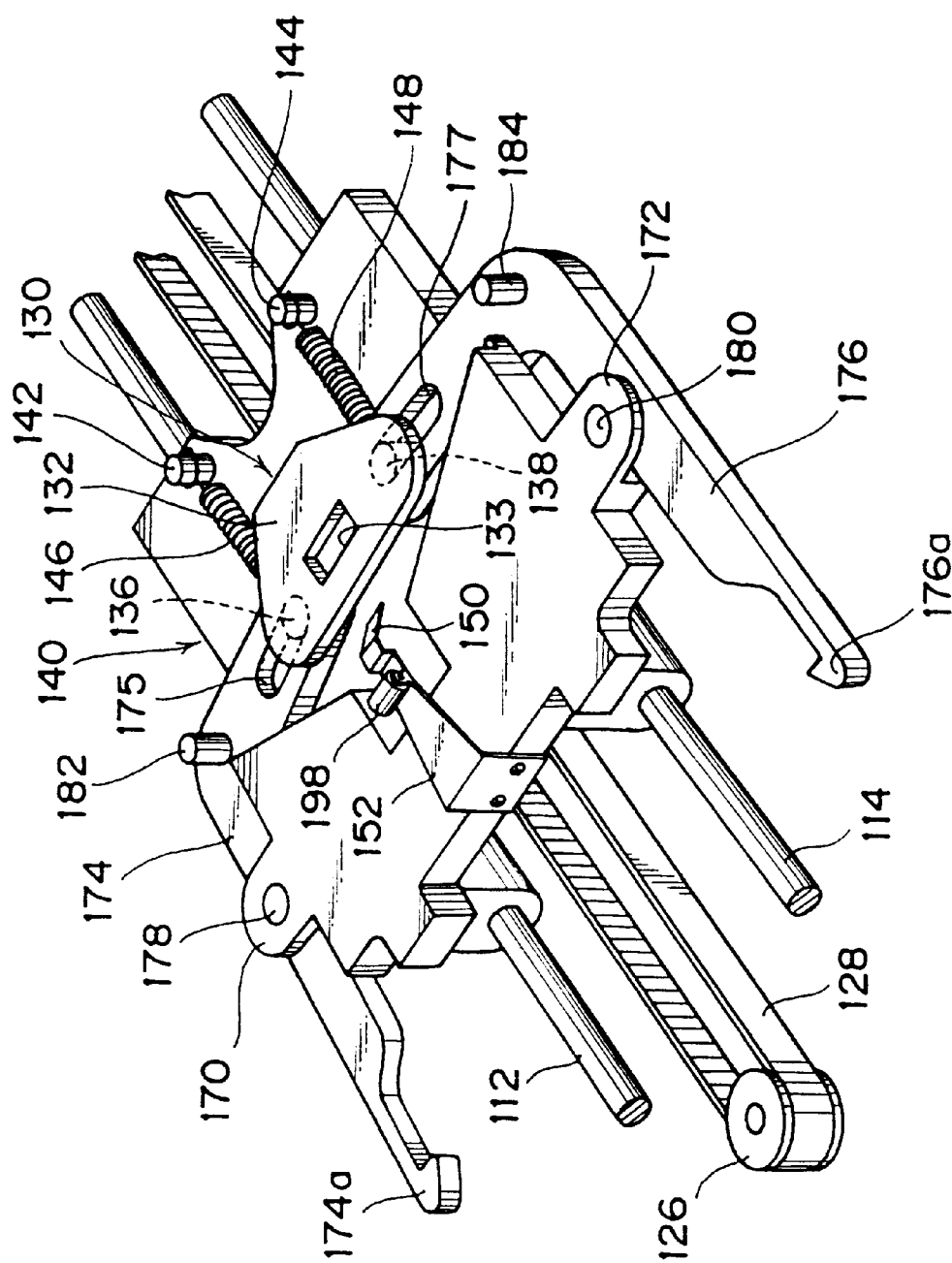
FIG. 12 is a perspective view of a hand mechanism.

This open/close operation of the fingers 174 and 176 by advancing the second slider 140 to the second advance position and then retracting it will now be described in more detail with reference to FIGS. 19A and 19B. As best shown in FIGS. 12 and 13, a leaf spring 152 having a hook 150 near the rear end is fixed to the second slider 140. A roller 198 is rotatably mounted on the leaf spring 152. The upper plate 132 of the first slider 130 has an opening 133 adapted to engage the hook 150.

As shown in FIG. 19A, the carrier frame 50 is integrally formed with a linear cam 196 having a projection 196a. The first and second sliders 130 and 140 slide in the condition where the roller 198 is always in contact with the linear cam 196. As mentioned above, the second slider 140 starts to be advanced with delay after the first slider 130 starts to be advanced. Therefore, in the initial stage after starting the advance of the sliders 130 and 140, the hook 150 and the opening 133 are shifted in position from each other, that is, the hook 150 does not come to engagement with the opening 133.

When the second slider 140 is advanced to the first advance position, the opening 133 comes near a position where it engages with the hook 150. At this time, however, the roller 198 climbs the projection 196a of the linear cam 196, so that the hook 150 comes away from the opening 133 and accordingly does not come to engagement with the opening 133. Accordingly, in retracting the second slider 140 after its advance to the first advance position, the projection 182 of the finger 174 passes the fourth portion 186d of the groove 186. Thus, the fingers 174 and 176 are advanced in the open condition, and are then retracted in the closed condition.

On the other hand, when the second slider 140 is further advanced beyond the first advance position, the roller 198 passes over the projection 196a of the cam 196 as shown in FIG. 19B, so that the hook 150 comes to engagement with the opening 133. As a result, the fingers 174 and 176 are locked in the open condition. While the second slider 140 is being advanced from the given position to the second advance position, the fingers 174 and 176 are kept locked in the open condition. In retracting the second slider 140 from the second advance position to the given position, the locked open condition of the fingers 174 and 176 is kept as shown in FIG. 19B, so that the projections 182 and 184 of the fingers 174 and 176 pass the third portions of the grooves 186 and 188 in the course of retraction as shown in FIG. 18C.

When the second slider 140 is retracted to reach the given position, the roller 198 climbs the projection 196a of the cam 196 to disengage the hook 150 from the opening 133 as shown in FIG. 19A. As a result, the fingers 174 and 176 are closed at this time. Thereafter, the fingers 174 and 176 are further retracted in the closed condition. In this manner, the combination of the hook 150 and the projection 196a of the cam 196 realizes a timing operation for keeping the fingers 174 and 176 open.

The advance distance of the first slider 130 from its first retract position as a home position (hereinafter described in detail) can be accurately obtained by counting the number of pulses output from the encoder 86 connected to the motor 48 in the counter 108 and inputting the count value into the MPU 88. Accordingly, the advance distance of the second slider 140 connected to the first slider 130 by the coil springs 146 and 148 can also be obtained from this count value. Therefore, whether the second slider 140 is to be moved to the first advance position or the second advance position can be decided by the MPU 88 which controls the operation of the motor 48 according to the number of pulses generated from the encoder 86.

In the case where the hand unit 40 of the accessor 2 extracts the optical disk cartridge 30 from a specified cell in the cell drum 3, the accessor 2 makes an access to the specified cell and then the second slider 140 is controlled to be advanced to the first advance position and then retracted. As the fingers 174 and 176 are advanced in the open condition and then retracted in the closed condition, the opposite side surfaces of the cartridge 30 can be gripped by the fingers 174 and 176 and then drawn through the rectangular opening 70 into the carrier frame 50.

In the case where the hand unit 40 inserts the optical disk cartridge 30 into a specified cell in the cell drum 3, the second slider 140 is controlled to be advanced to the second advance position and then retracted. At the time the fingers 174 and 176 gripping the cartridge 30 start to insert the cartridge 30 into the cell, the fingers 174 and 176 are gradually opened as the sliders 130 and 140 are advanced, and thereafter are locked in the full open condition. In this condition, the fingers 174 and 176 have no interference with the cell drum 3, and the cartridge 30 is urged into the cell by a pair of projections 154 formed at the front end of the second slider 140.

Figure 20:
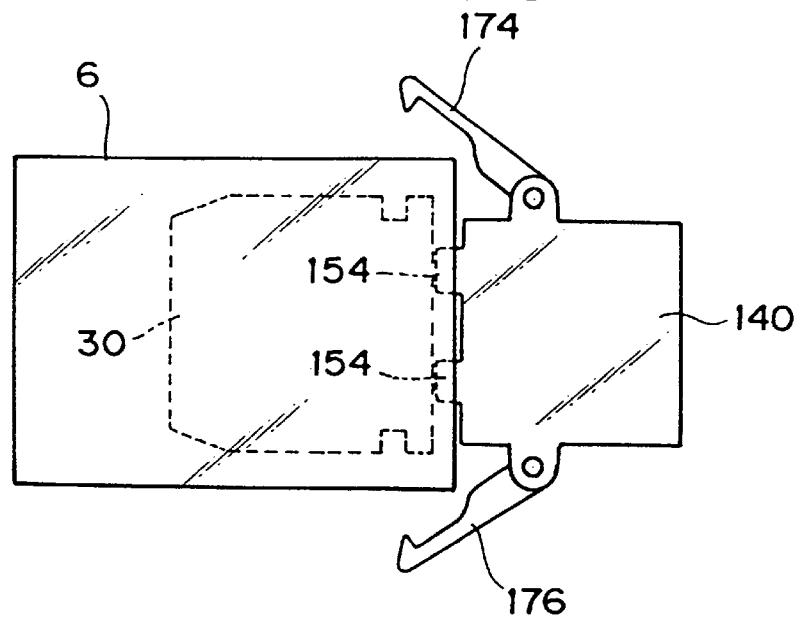
FIG. 20 is a plan view showing the relation between a drive unit and a hand unit.

The operation of inserting or extracting the cartridge 30 into or out of a specified drive unit 6 will now be described with reference to FIG. 20. In the case of inserting the cartridge 30 into the specified drive unit 6, the second slider 140 is controlled to be advanced to the second advance position and then retracted. Since the fingers 174 and 176 are locked in their full open condition in concert with the advance of the second slider 140, the fingers 174 and 176 have no interference with the drive unit 6 as shown in FIG. 20, and the cartridge 30 can be urged into the drive unit 6 by the pair of projections 154 formed at the front end of the second slider 140.

After completing data reading or writing in the drive unit 6, the optical disk cartridge 30 is partially ejected from the drive unit 6 by pushing an eject button or by receiving an eject signal from a host computer or a server. In this condition, a part of the cartridge 30 is exposed to the outside of the drive unit 6. Thereafter, the operation of extracting the cartridge 30 from the drive unit 6 is performed by the hand unit 40. That is, the second slider 140 is controlled to be advanced to the first advance position and then retracted. Accordingly, the cartridge 30 partially exposed to the outside of the drive unit 6 can be gripped by the fingers 174 and 176 and then drawn into the carrier frame 50.

A side reversing mechanism for reversing the cartridge 30 will now be described with reference to FIGS. 22, 23A, and 23B. A first rotation preventing member 200 is pivotably mounted on a shaft 202 fixed to the hand base 44. As shown in FIG. 23A, the first rotation preventing member 200 is normally biased clockwise by a coil spring 204 to abut against a projecting portion 50a of the carrier frame 50. While the carrier frame 50 is normally biased to rotate in one direction as previously mentioned with reference to FIG. 21, the normal rotation of the carrier frame 50 is inhibited by the abutment of the first rotation preventing member 200 against the projecting portion 50a of the carrier frame 50 when the second slider 140 is located between the second advance position and the first retract position as the home position.

Further, a second rotation preventing member 208 is pivotably mounted on a shaft 210 fixed to the hand base 44. The second rotation preventing member 208 is normally biased clockwise as viewed in FIG. 22 by a coil spring 212 to prevent the reverse rotation of the carrier frame 50. As best shown in FIG. 4, a pair of abutment canceling members 206 are formed integrally with the opposite side surfaces of the second slider 140. When the second slider 140 is retracted from the first retract position to a second retract position, the abutment canceling members 206 are moved rearward in a pair of side openings 50b of the carrier frame 50 as shown in FIG. 23B.

Figure 23A:
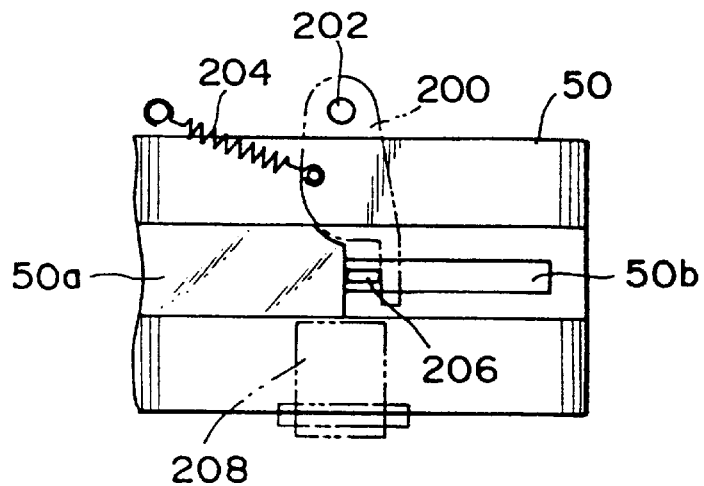
FIGS. 23A and 23B are side views of the cartridge side reversing mechanism.
Figure 23B:
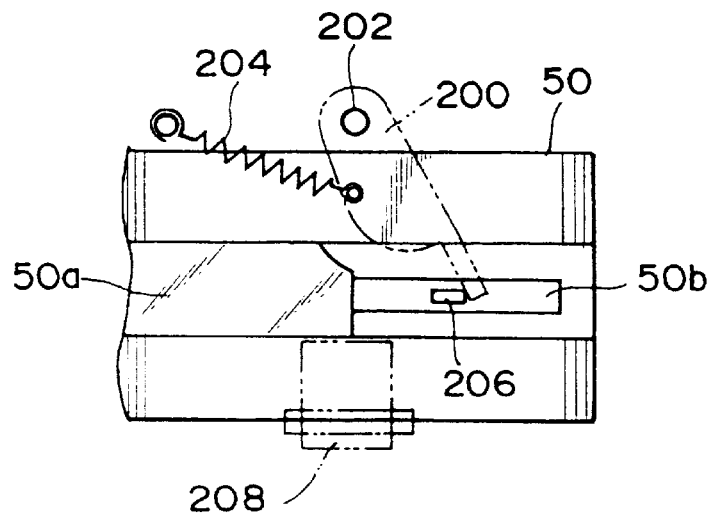

In intentionally reversing the cartridge 30, that is, turning the cartridge 30 upside down, the second slider 140 is retracted from the first retract position to the second retract position as shown in FIG. 23B. As a result, one of the abutment canceling members 206 urges the first rotation preventing member 200 against the biasing force of the coil spring 204 to pivot the first rotation preventing member 200 counterclockwise as viewed in FIG. 23B. Accordingly, the abutment of the first rotation preventing member 200 against the projecting portion 50a of the carrier frame 50 is canceled to allow the normal rotation of the carrier frame 50.

Figure 22:
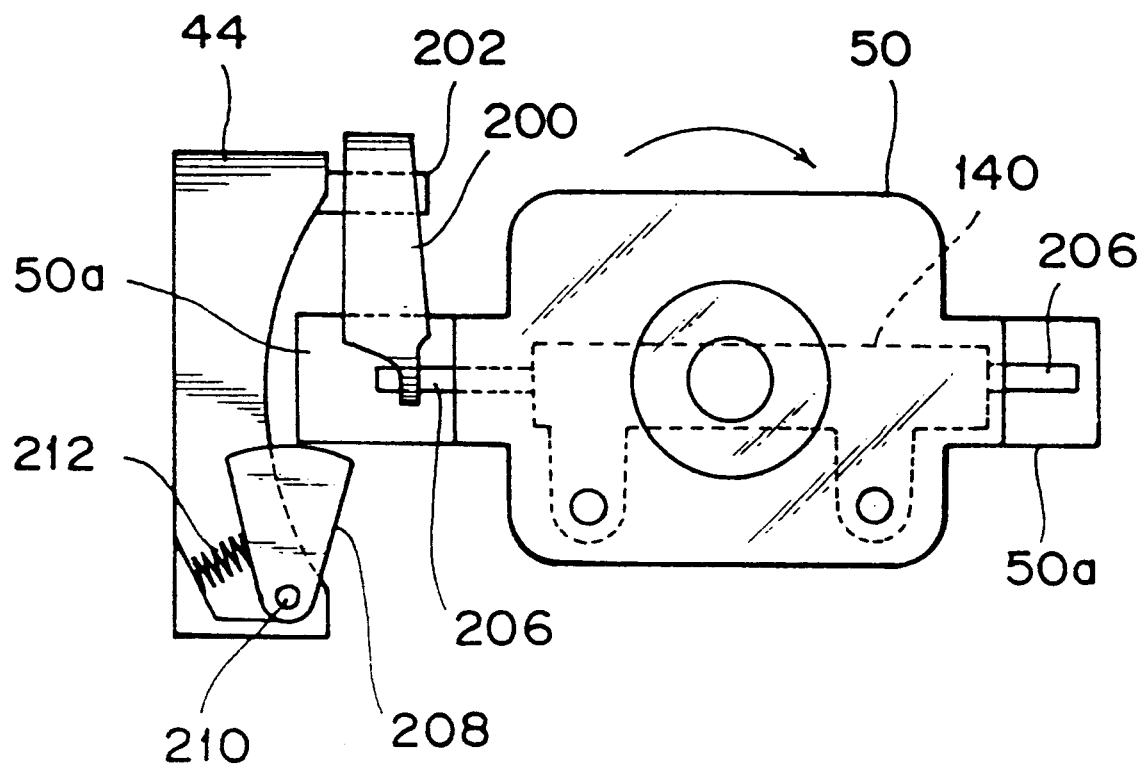
FIG. 22 is an elevational view showing a cartridge side reversing mechanism.

When the carrier frame 50 is rotated clockwise as viewed in FIG. 22, the engagement of one of the abutment canceling members 206 with the first rotation preventing member 200 is canceled, so that the first rotation preventing member 200 is returned to the condition shown in FIG. 23A by the biasing force of the coil spring 204. At the time the carrier frame 50 is rotated 180°, another projecting portion 50a of the carrier frame 50 comes into abutment against the first rotation preventing member 200, thus locking the carrier frame 50 again. In this manner, the reversing operation of the cartridge 30 can be easily performed to thereby allow data reading/writing on both sides of the optical disk in the cartridge 30 when it has data areas on both sides.

A forcible cartridge ejecting mechanism in each optical disk drive unit 6 will now be described with reference to FIGS. 24 and 25. The optical disk cartridge 30 includes a cartridge case 220 and an optical disk 222 rotatably contained in the cartridge case 220. Reference numeral 224 denotes a shutter which is normally biased to be closed by a coiled shutter spring 226. One end 226a of the shutter spring 226 is engaged with the cartridge case 220, and the other end 226b is engaged with the shutter 224. A shutter open/close member 228 is mounted integrally at the front end of the shutter 224.

An L-shaped cartridge eject arm 234 is pivotably mounted on a pivot shaft 232 provided in a cartridge holder 230 of the drive unit 6. The cartridge eject arm 234 is biased clockwise as viewed in FIG. 24 by a coil spring 236 mounted on the pivot shaft 232. Reference numeral 238 denotes a coiled cartridge eject spring engaged at one end thereof with the cartridge eject arm 234 and engaged at the other end with a shutter open/close roller 240.

When the optical disk cartridge 30 is inserted into the cartridge holder 230 of the drive unit 6 as shown in FIG. 24, the shutter open/close roller 240 is urged by the front end of the cartridge case 220 against the biasing force of the cartridge eject spring 238 to move in a roller groove 242 curvedly extending toward the depth of the cartridge holder 230. At the same time, the shutter open/close roller 240 pushes the shutter open/close member 228 against the biasing force of the shutter spring 226 to open the shutter 224 and thereby expose the optical disk 222 through a window 244.

Figure 25:
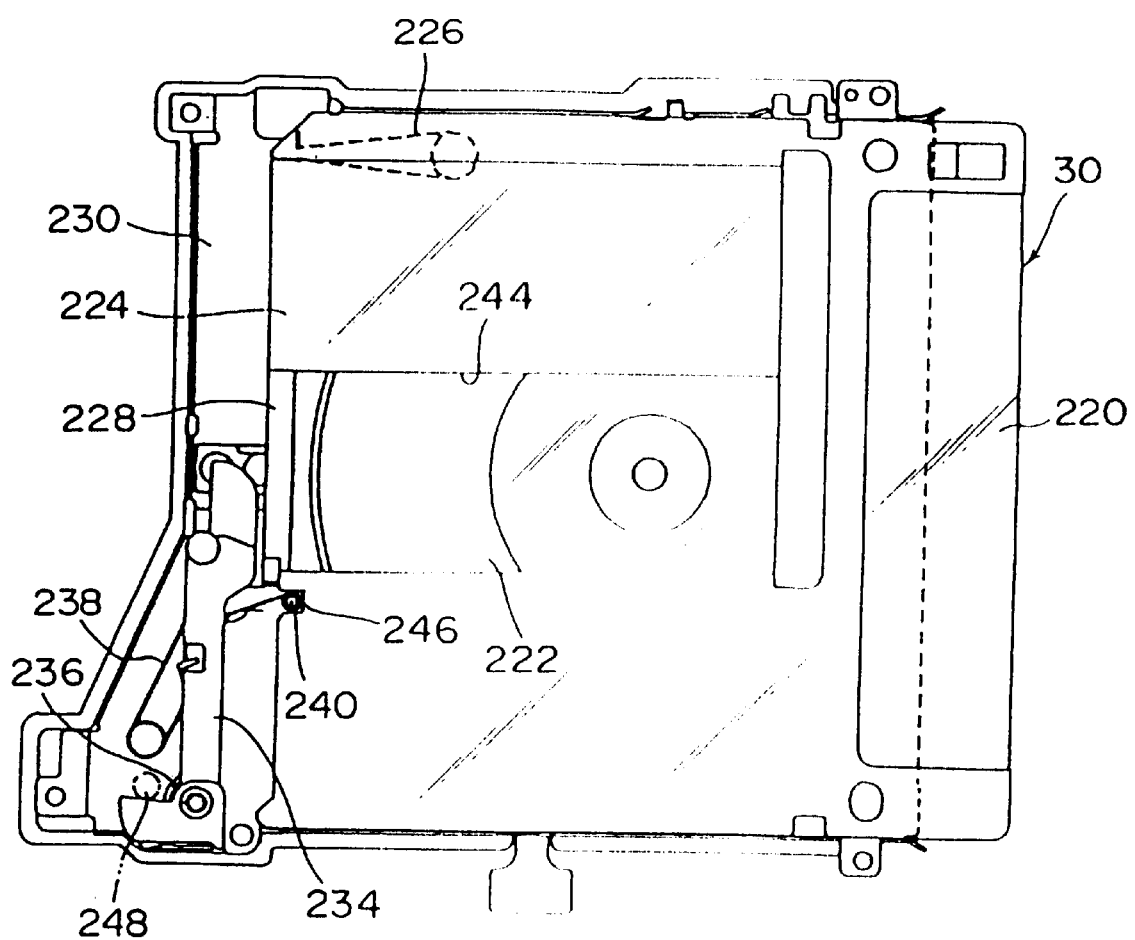
FIG. 25 is a view similar to FIG. 24, showing a condition where the cartridge is fully inserted in the drive unit.

When the optical disk cartridge 30 is further inserted as shown in FIG. 25, the shutter 224 is fully opened and the shutter open/close roller 240 comes into engagement with a notch 246 formed on the front end of the cartridge case 220. At the same time, a lock member 248 projects to lock the cartridge eject arm 234 in the condition shown in FIG. 25. In this condition, the shutter eject spring 238 is deformed into such a shape as shown in FIG. 25 where the shutter 224 is fully opened, the optical disk 222 is mounted and chucked on a spindle provided in the optical disk drive unit 6. Then, the optical disk 222 is rotated at a high speed by a spindle motor, and data is read from or written onto the optical disk 222 by the optical head.

In ejecting the cartridge 30 from the drive unit 6, a cartridge eject command is issued from the host computer connected to the optical disk library device. As a result, the lock member 248 is disengaged from the cartridge eject arm 234 to allow the cartridge eject arm 234 to be pivoted clockwise by the biasing force of the coil spring 236. In association with the pivotal motion of the cartridge eject arm 234, the shutter open/close roller 240 is biased by the cartridge eject spring 238 to travel in the roller groove 242. During the travel of the shutter open/close roller 240 in the roller groove 242, the cartridge 30 is pushed by the shutter open/close roller 240 and is ejected from the cartridge holder 230.

In this manner, when the cartridge eject command is issued from the host computer connected to the library device, the optical disk cartridge 30 is forcibly ejected from the drive unit 6 by the biasing force of the cartridge eject spring 238. However, if the biasing force of the cartridge eject spring 238 is too strong, there is a possibility that the cartridge 30 may be forced to jump out of the drive unit 6. To cope with this, the optical disk library device according to the present invention includes stopper means provided in opposition to the cartridge inlet/outlet end of each drive unit 6, for inhibiting excess ejection of the cartridge 30.

Figure 26:
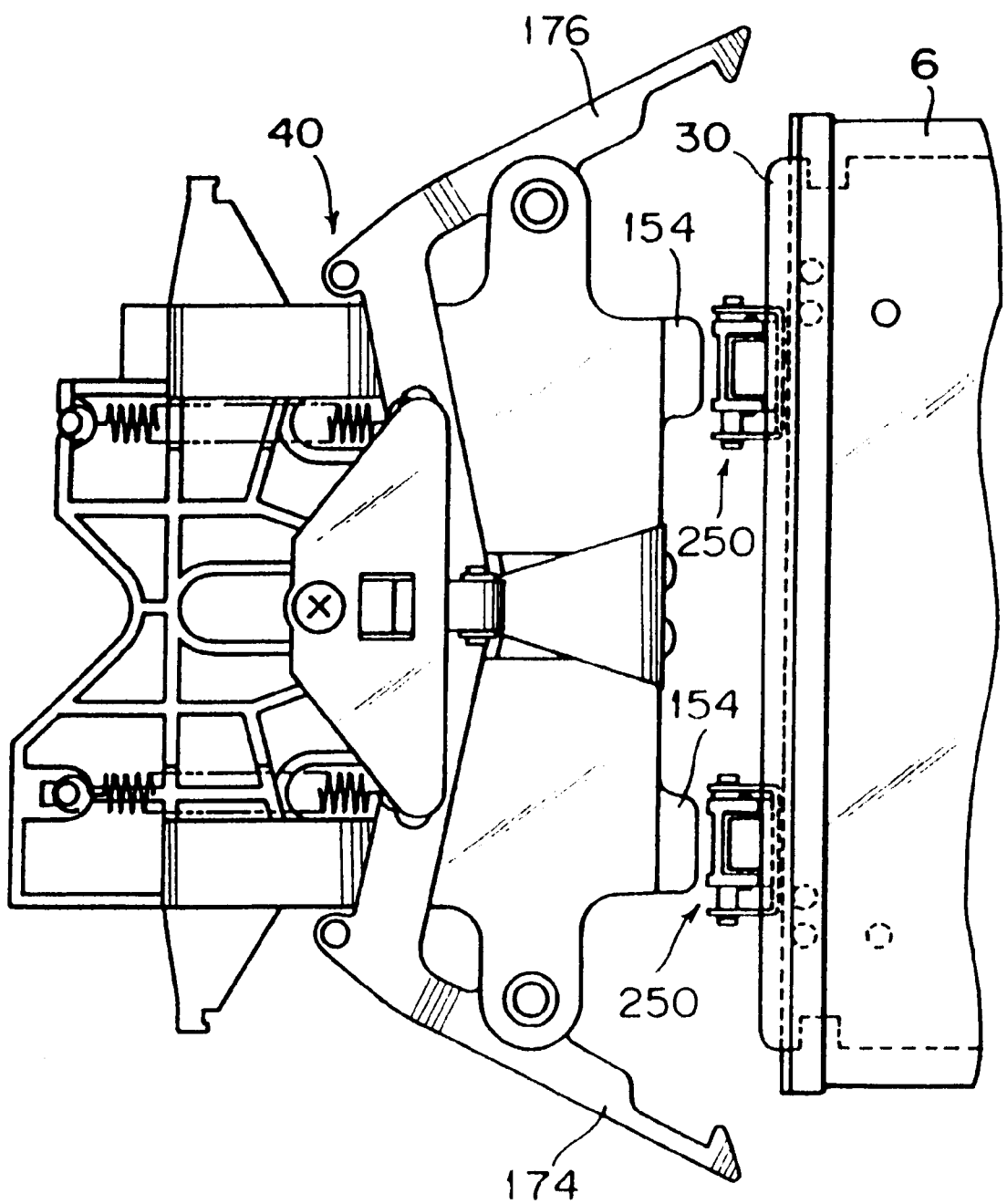
FIG. 26 is a plan view showing a condition where the hand unit has approached the drive unit in the eject operation of the cartridge according to another preferred embodiment of the present invention.
Figure 27:
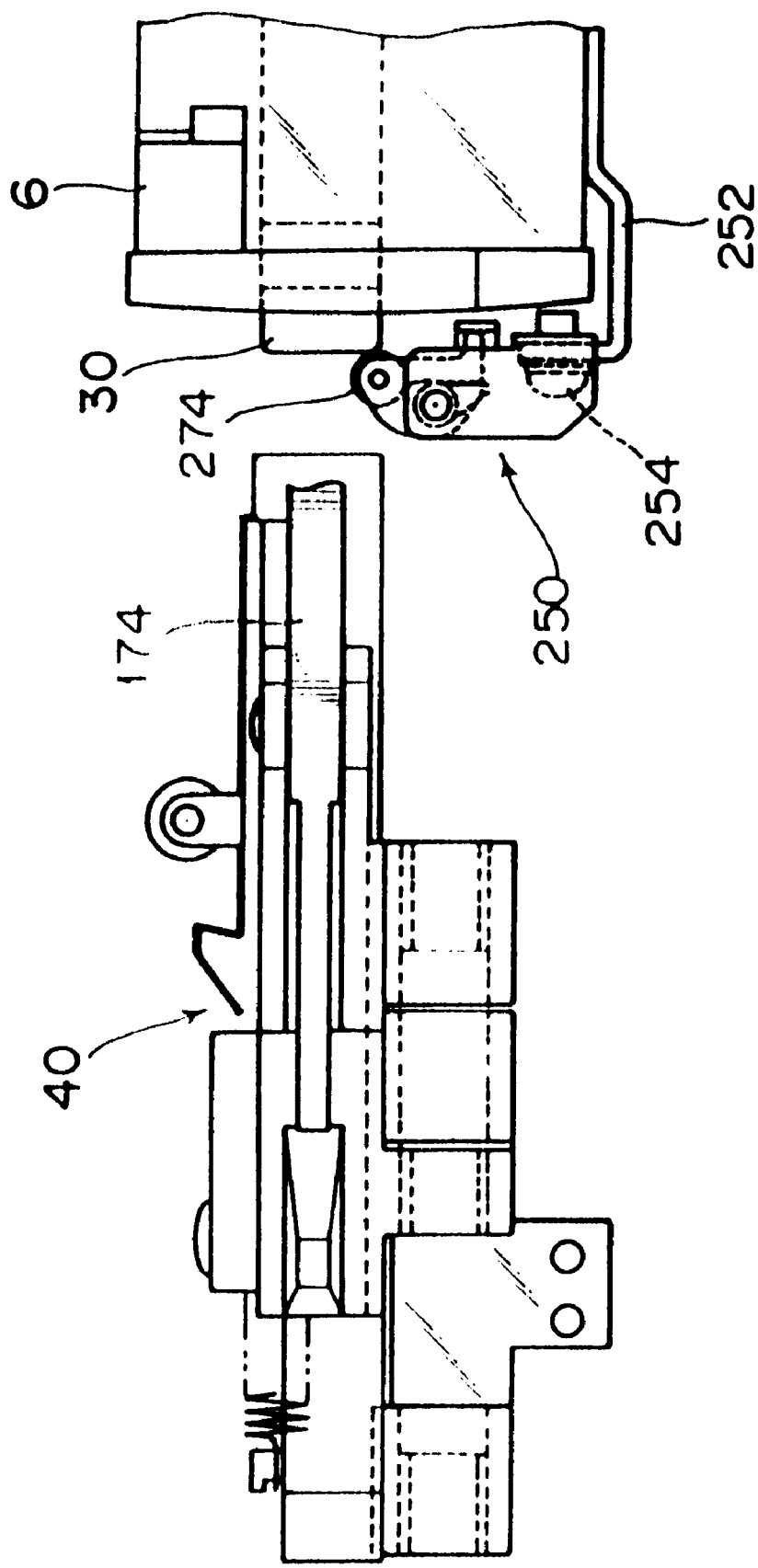
FIG. 27 is a side view of FIG. 26.

The stopper means will now be described in detail with reference to FIGS. 26 to 34. Referring to FIGS. 26 and 27, there are shown a plan view and a side view, respectively, of another preferred embodiment of the present invention in ejecting the cartridge 30. As shown in FIG. 26, a pair of stopper mechanisms 250 are provided in opposition to the cartridge inlet/outlet end of the optical disk drive unit 6.

As similar to the previous preferred embodiment, a hand unit 40 has a pair of fingers 174 and 176 designed to be opened and closed, and a pair of projections 154 are provided on the front end of the hand unit 40 to push the cartridge 30 into the drive unit 6. The pair of stopper mechanisms 250 are located at positions corresponding to the pair of projections 154. As shown in FIG. 27, each stopper mechanism 250 is mounted on a support member 252 by means of screws 254. The support member 252 is fixed in the library device.

Figure 28A:
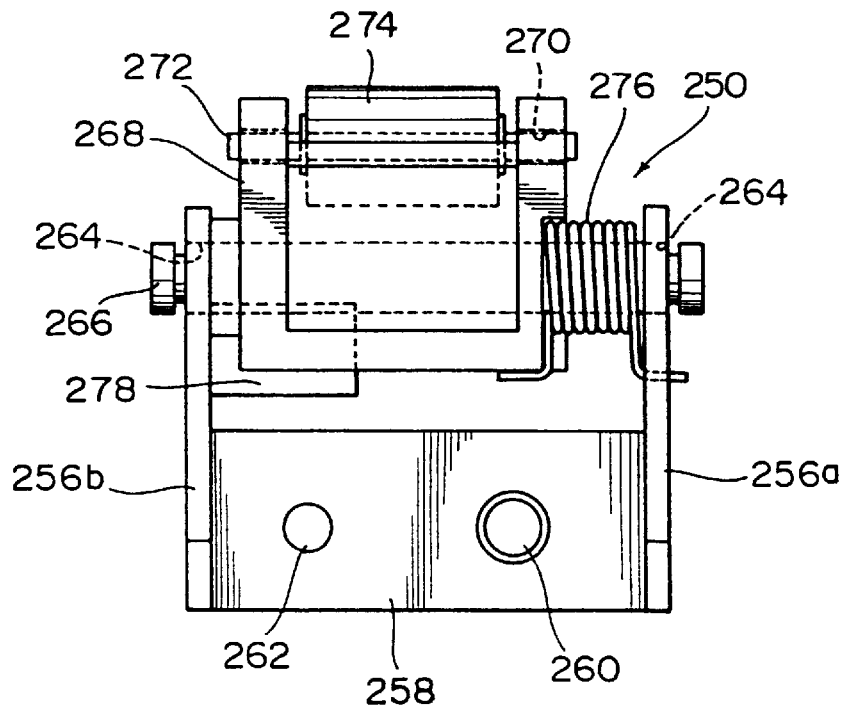
FIG. 28A is an elevational view of a stopper mechanism shown in FIGS. 26 and 27.
Figure 28B:
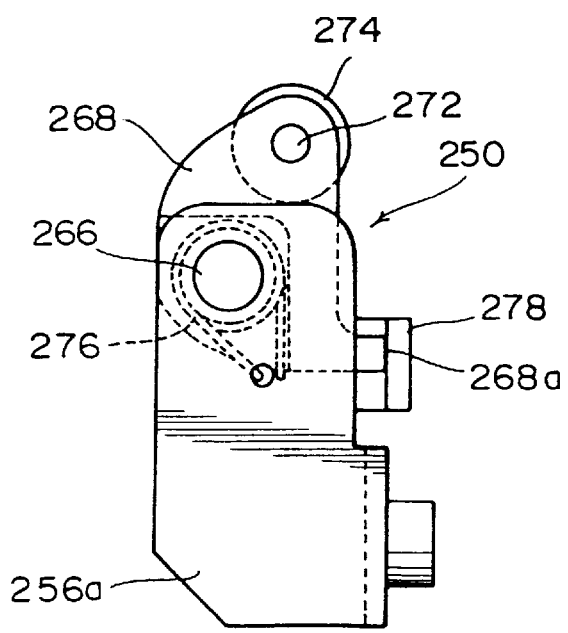
FIG. 28B is a side view of FIG. 28A.

The structure of the stopper mechanism 250 will now be described in detail with reference to FIGS. 28A and 28B. As shown in FIG. 28A, a pair of support members 256*a* and 256*b* are integrally connected together and spaced a given distance by a connecting member 258. The connecting member 258 is formed with holes 260 and 262 for receiving the screws 254 to be secured to the support member 252 in the library device. A shaft 266 is loosely engaged with two holes 264 formed at the upper end portions of the support members 256*a* and 256*b*. A sectionally U-shaped pivotable member 268 is pivotably mounted on the shaft 266. A shaft 272 is rotatably inserted through two holes 270 formed at the upper end portions of the pivotable member 268. A roller 274 is mounted on the shaft 272.

A coil spring 276 is mounted on the shaft 266 rotatably supported to the support members 256*a* and 256*b*. One end of the coil spring 276 is engaged with the support member 256*a*, and the other end is engaged with the pivotable member 268. Accordingly, the pivotable member 268 is normally biased counterclockwise as viewed in FIG. 28B by the biasing force of the coil spring 276. A pivot limiting member 278 is fixed to the support member 256*b*, and as shown in FIG. 28B, a front end 268*a* of the pivotable member 268 normally abuts against the pivot limiting member 278, thus limiting the counterclockwise pivot motion of the pivotable member 268.

Figure 29:
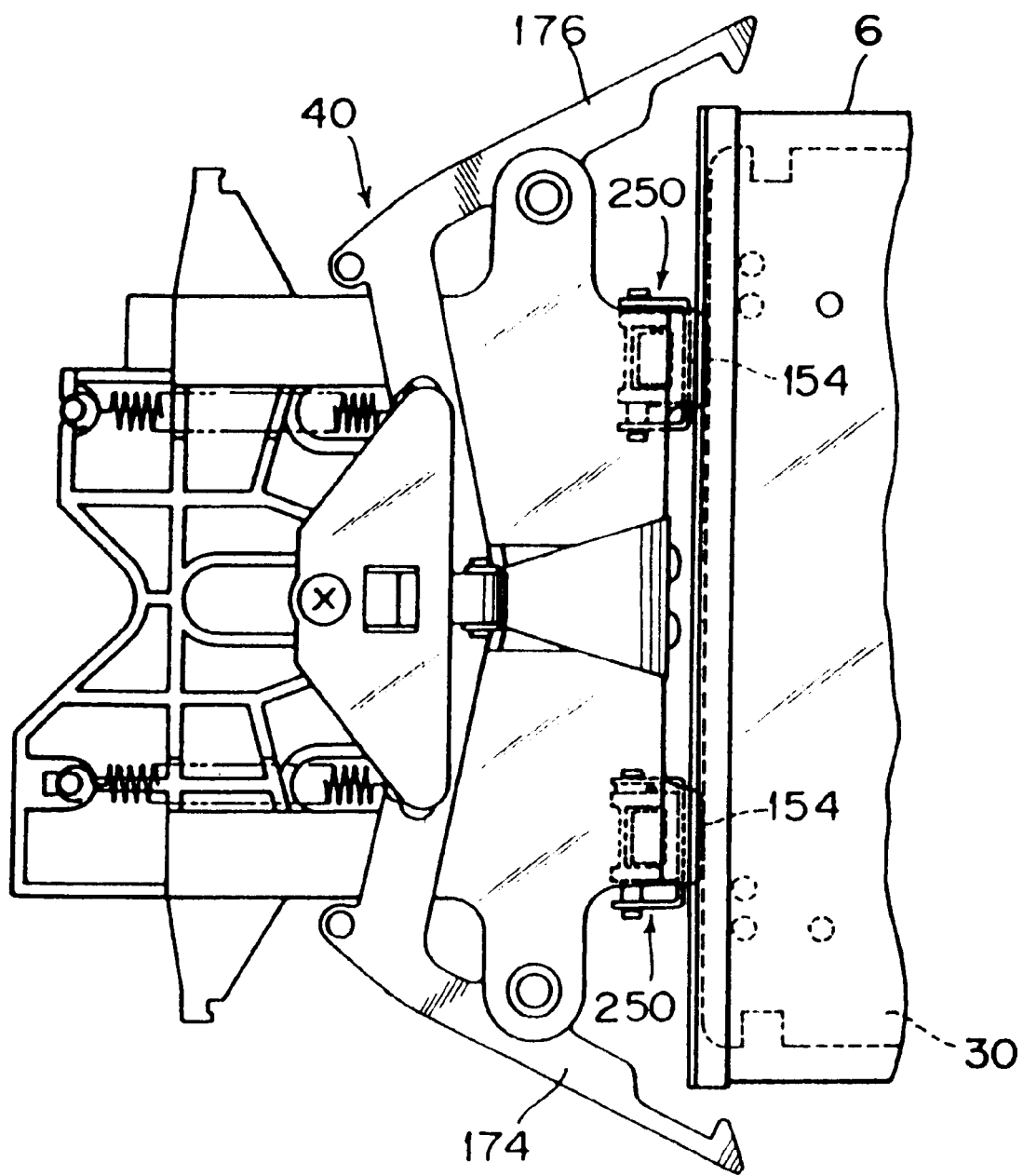
FIG. 29 is a plan view showing a condition where the hand unit has come into contact with the cartridge in the cartridge eject operation.
Figure 30:
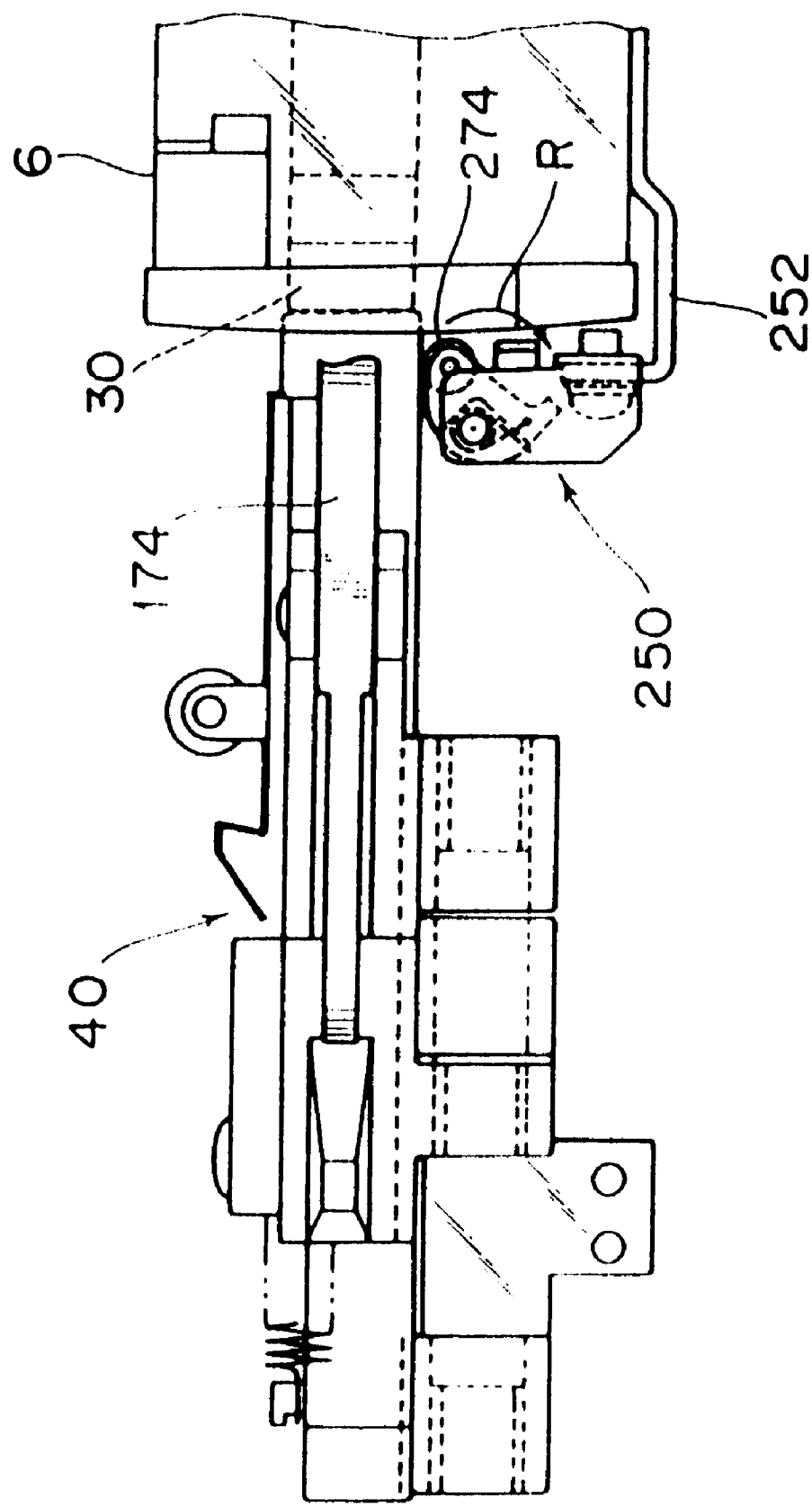
FIG. 30 is a side view of FIG. 29.

When the cartridge 30 is ejected from the drive unit 6 by the biasing force of the eject spring 238 (see FIG. 24) as shown in FIGS. 26 and 27, the rear end of the cartridge 30 comes into collision with the two rollers 274 of the stopper mechanisms 250, thereby inhibiting excess ejection of the cartridge 30. When the hand unit 40 of the accessor approaches the drive unit 6 from this condition as shown in FIGS. 29 and 30, the two projections 154 of the hand unit 40 come into collision with the two rollers 274 of the stopper mechanisms 250, and then clockwise pivot the two rollers 274 with the pivotable members 268 as shown by an arrow R in FIG. 30 against the biasing forces of the coil springs 276.

In this manner, the rollers 274 of the stopper mechanisms 250 are pivoted to lower after the collision with the projections 154 of the hand unit 40, thereby allowing insertion of the projections 154 into the drive unit 6. At this time, the cartridge 30 is slightly pushed back into the drive unit 6 by the projections 154 of the hand unit 40 as shown in FIG. 30. Thereafter, when the hand unit 40 is slowly retracted from the drive unit 6, the cartridge 30 is allowed to pass over the rollers 274 of the stopper mechanisms 250 in the eject direction by the biasing force of the eject spring 238, because the rollers 274 are kept in the lowered condition as shown in FIG. 30.

Figure 31:
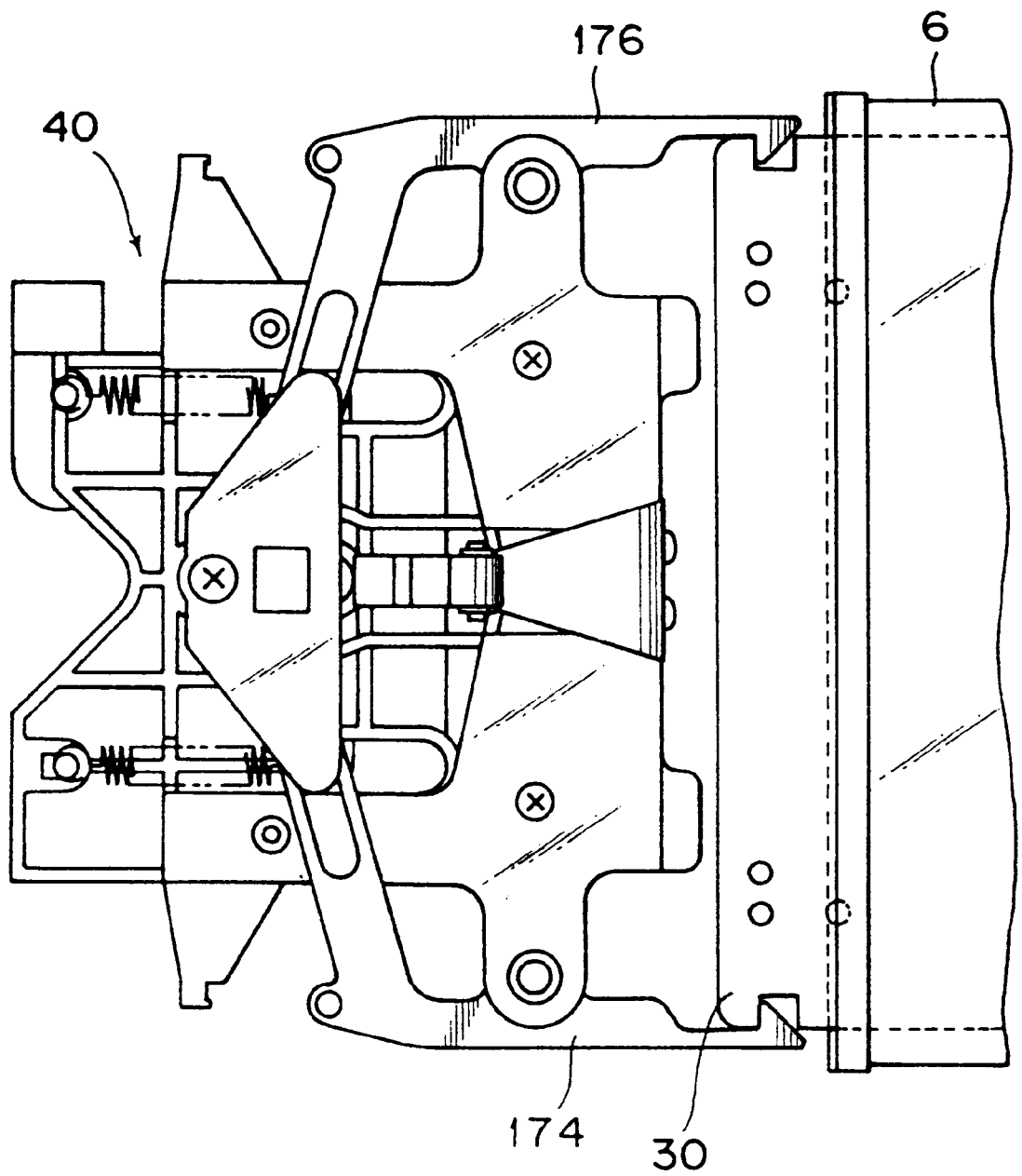
FIG. 31 is a plan view showing a condition where the hand unit has extracted the cartridge in the cartridge eject operation.
Figure 32:
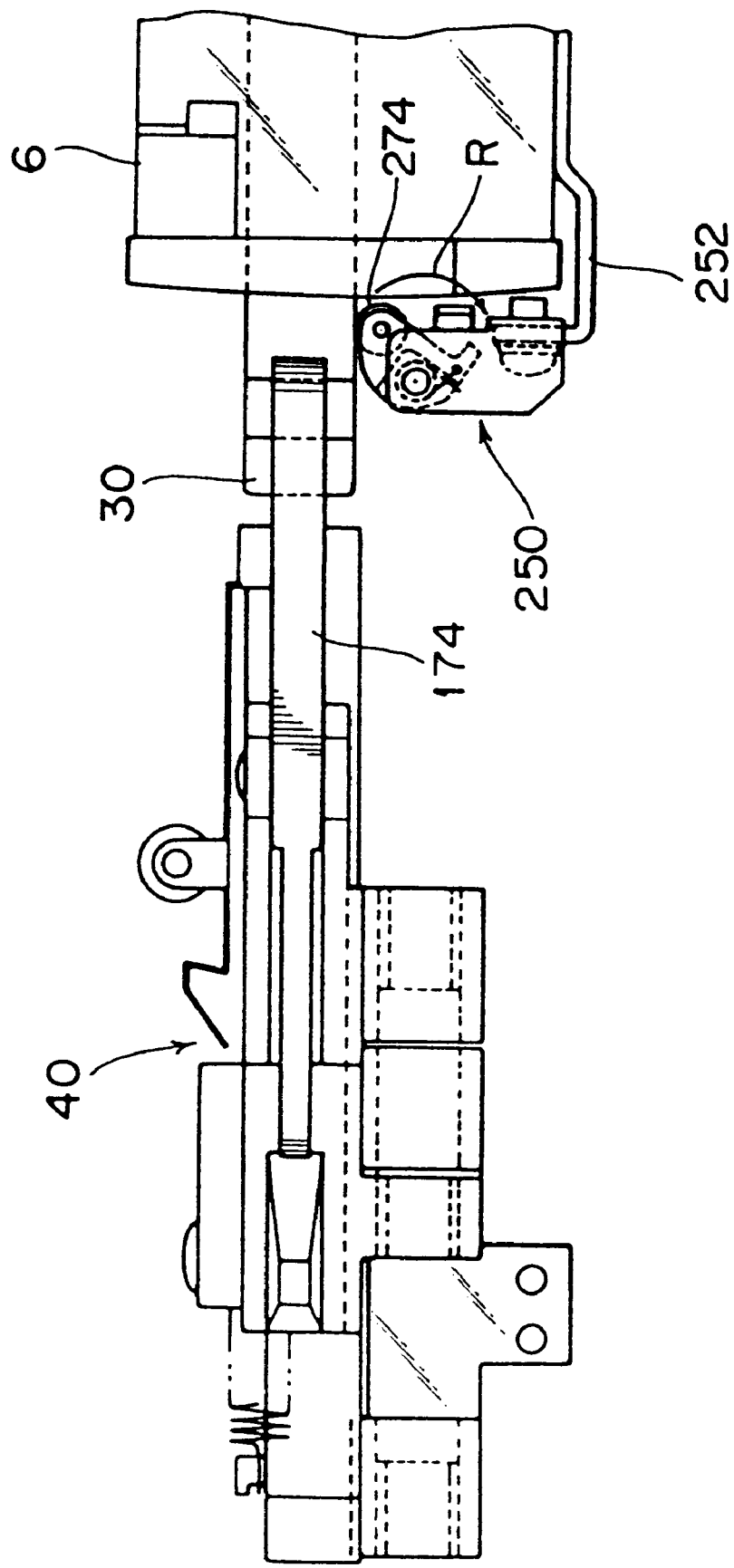
FIG. 32 is a side view of FIG. 31.

After the cartridge 30 has passed over the rollers 274 of the stopper mechanisms 250 and is sufficiently ejected from the drive unit 6, the cartridge 30 can be gripped by the fingers 174 and 176 of the hand unit 40 as shown in FIGS. 31 and 32. Then, the cartridge 30 is drawn out of the drive unit 6 by the hand unit 40.

Figure 33:
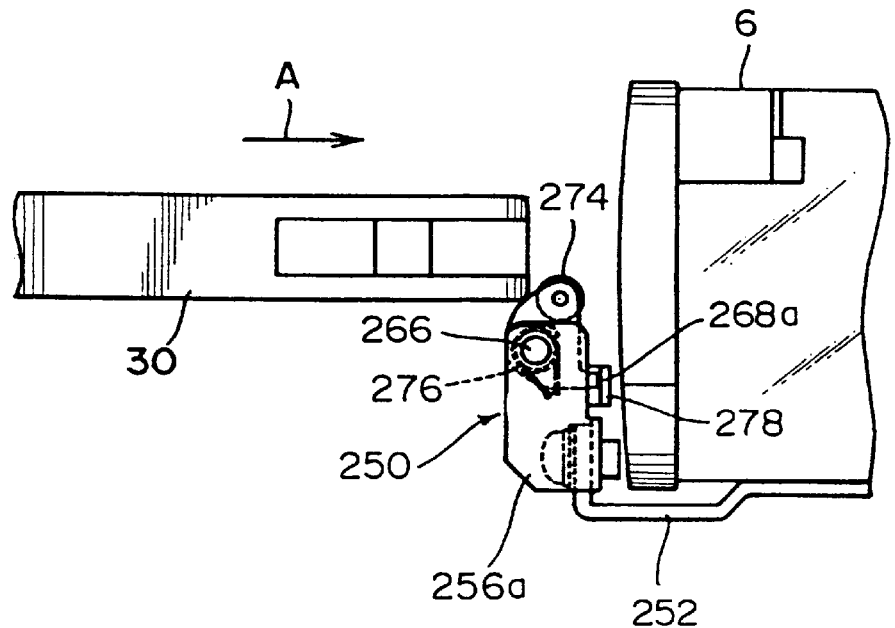
FIG. 33 is a side view showing a condition where the cartridge has come near the drive unit in the cartridge insert operation.
Figure 34:
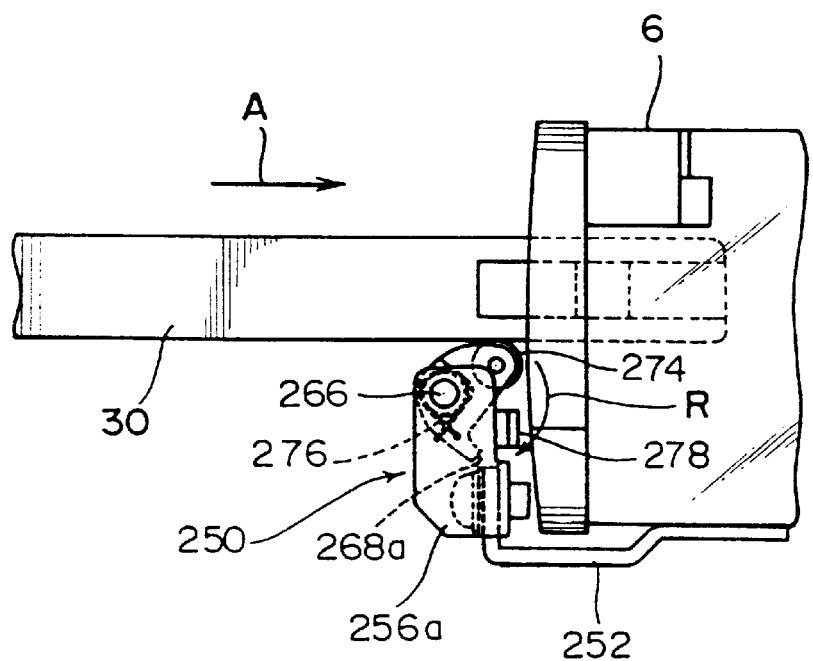
FIG. 34 is a side view showing a condition where the cartridge has just been inserted into the drive unit in the cartridge insert operation.

The operation of inserting the cartridge 30 into the drive unit 6 will now be described with reference to FIGS. 33 and 34. As shown in FIG. 33, the cartridge 30 is moved in a direction shown by an arrow A by the hand unit 40 of the accessor 2 and then inserted into the drive unit 6. At this time, the rollers 274 of the stopper mechanisms 250 are pivoted clockwise as shown by an arrow R in FIG. 34 by the pushing force of the hand unit 40 against the biasing forces of the coil springs 276 as mentioned above with reference to FIGS. 29 and 30. Accordingly, the cartridge 30 can be inserted into the drive unit 6.

Figure 35:
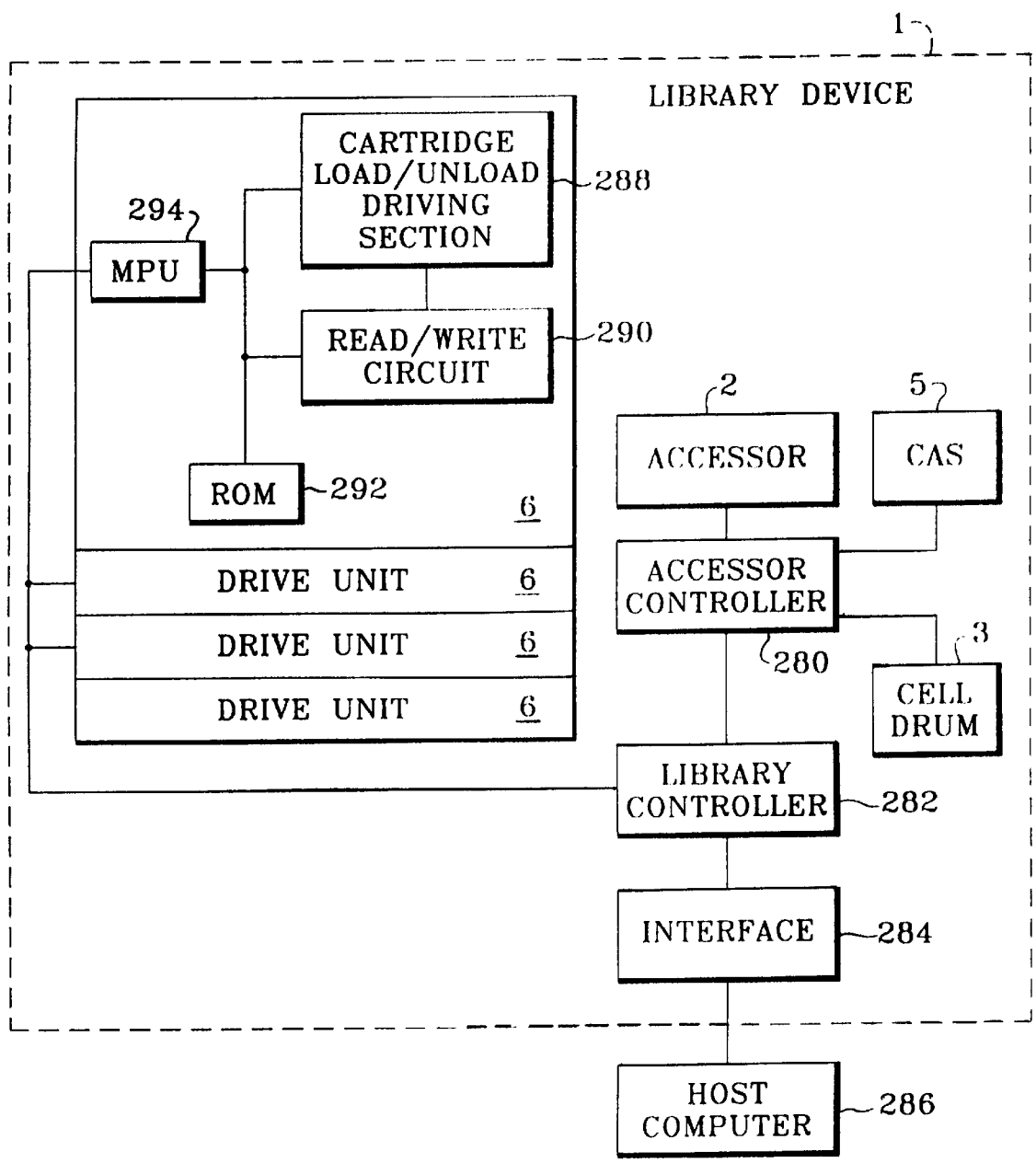
FIG. 35 is a block diagram showing a control system in the library device.

A control system in the library device will now be described with reference to FIG. 35. An accessor controller 280 in the library device 1 controls the accessor 2, the cell drum 3, and the CAS (cartridge access station) 5. The accessor controller 280 is connected to a library controller 282 and is controlled by the library controller 282.

Each drive unit 6 includes a cartridge load/unload driving section 288, a read/write circuit 290, and a ROM 292. These elements 288, 290, and 292 are controlled by an MPU 294 as a drive unit controller. The MPU 294 in each drive unit 6 is connected to the library controller 282 and is controlled by the library controller 282. The library controller 282 is connected through an interface 284 to a host computer 286.

The library controller 282 independently controls the accessor controller 280 and the MPU 294 in each drive unit 6. For example, in ejecting the cartridge 30 from a specified one of the drive units 6, the library controller 282 transmits a cartridge unload command to the MPU 294 in the specified drive unit 6, and in parallel thereto transmits a cartridge extract command to the accessor controller 280. The cartridge unload operation is completed before the accessor 2 reaches the specified drive unit 6. However, the accessor 2 may be moved after the cartridge unload (eject) operation is completed, because the stopper mechanisms 250 are provided to prevent the cartridge 30 from jumping out of the specified drive unit 6.

In the prior art library device, the library controller transmits a cartridge unload command to a specified drive unit after the accessor has reached the specified drive unit. Accordingly, the cartridge access operation and the cartridge unload operation are performed in a sequential fashion, causing an increase in time consumed and a complexity of the controller in both aspects of software and hardware.

Although each preferred embodiment of the present invention described above is applied to a accessor hand mechanism in an optical disk library device, the present invention is not limited to the above preferred embodiments, but may be similarly applied to an accessor hand mechanism in another library device handling magnetic tape cartridges or the like.

According to the present invention described above, the accessor operation for cartridge transfer, the cartridge gripping operation, and the cartridge side reversing operation can be realized by the use of only one motor, thereby attaining energy saving and cost reduction in the accessor hand unit. Further, the accessor hand unit can be reduced in size and weight, thereby attaining an improvement in positioning accuracy of the front end of the hand.

Further, since the stopper mechanisms are provided in opposition to the cartridge inlet/outlet end of each drive unit, the recording medium cartridge can be ejected from the drive unit irrespective of the position of the accessor, and accordingly the recording medium cartridge can be quickly transferred between the accessor and the drive unit. In addition, since the accessor and the drive unit are controlled independently of each other, it is unnecessary to perform any complex control such that the accessor and the drive unit are connected together through a controller to perform a sequential operation.

What is claimed is:

1. A library device comprising:

a cartridge load/unload mechanism for loading a recording medium cartridge into said library device and unloading said cartridge from said library device;

a cell unit having a plurality of cells each for containing said cartridge;

a drive unit for reading and writing data from and to a recording medium contained in said cartridge, said drive unit having an inlet/outlet end and ejecting means for ejecting said cartridge from said drive unit through said inlet/outlet end, said cartridge having a front side that faces said inlet/outlet end when said cartridge is positioned within said drive unit, an accessor for carrying said cartridge between said cartridge load/unload mechanism, said cell unit, and said drive unit;

stopping means for stopping said cartridge upon ejection at a predetermined point before the cartridge leaves said drive unit, said stopping means stopping said cartridge by colliding with said front side; and an elastic member for pivotably biasing said stopping means in an ejecting direction of said cartridge, said ejecting direction being a direction heading away from said inlet/outlet end in an exterior of said drive unit, wherein in inserting said cartridge into said drive unit by means of said accessor, said stopping means allows insertion of said cartridge into said drive unit and in ejecting said cartridge from said drive unit, said stopping means stops said cartridge before said cartridge obstructs movement of said accessor.

2. A library device according to claim 1, wherein said accessor further has a hand mechanism for gripping said cartridge, said hand mechanism having a front end formed with a pair of projections adapted to push said cartridge into said drive unit; and said stopping means further includes a pair of stopper mechanisms corresponding to said pair of projections of said hand mechanism.

3. A library device according to claim 1, wherein said stopping means comprises a roller rotatably mounted, said elastic member further pivotably biasing said roller in said ejecting direction of said cartridge, and means for limiting a pivotal motion of said roller in said ejecting direction of said cartridge.

4. A library device according to claim 1, wherein said stopping means comprises a support member fixed in said library device, a pivotable member pivotably supported to said support member, a roller rotatably mounted to said pivotable member, said elastic member further pivotably biasing said pivotable member in said ejecting direction of said cartridge, and means for limiting a pivotal motion of said pivotable member in said ejecting direction of said cartridge.

5. A library device comprising:

a drive unit for reading and writing data from and onto a recording medium contained in a recording medium cartridge, said drive unit having a cartridge inlet/outlet end and ejecting means for ejecting said cartridge from said drive unit;

an accessor for carrying said cartridge;

stopping means provided in opposition of said cartridge inlet/outlet end of said drive unit, for limiting the distance the cartridge is ejected from said inlet/outlet end, said stopping means being disposed so that said stopping means stops said cartridge before said cartridge obstructs movement of said accessor;

accessor control means for controlling said accessor;

drive unit control means for controlling said drive unit; and an elastic member for pivotably biasing said stopping means in an ejecting direction of said cartridge, said ejecting direction being a direction heading away from said inlet/outlet end in an exterior of said drive unit, wherein said accessor control means and said drive unit control means respectively control said accessor and said drive unit independently of each other so that ejection of said cartridge is performed regardless of the position of said accessor.

6. A library device including a plurality of recording medium cartridges, comprising:

a cartridge load/unload mechanism for loading said recording medium cartridge into said library device and unloading said cartridge from said library device;

a cell unit having a plurality of cells each for containing said cartridge;

a drive unit for reading and writing data from and to a recording medium contained in said cartridge, said drive unit having a casing, an inlet/outlet end and ejecting means for ejecting said cartridge from said drive unit through said inlet/outlet end, said casing having an exterior;

an accessor for carrying said cartridge between said cartridge load/unload mechanism, said cell unit, and said drive unit; and a stopper limiting the distance the cartridge is ejected from said inlet/outlet end and secured to said exterior of said casing, said stopper having an elastic member for pivotably biasing said stopper in an ejecting direction of said cartridge, said ejecting direction being a direction heading away from said inlet/outlet end in an exterior of said drive unit.

7. A library device comprising:

a cartridge load/unload mechanism for loading a recording medium cartridge into said library device and unloading said cartridge from said library device;

a cell unit having a plurality of cells each for containing said cartridge;

a drive unit for reading and writing data from and to a recording medium contained in said cartridge, said drive unit having an inlet/outlet end and ejecting means for ejecting said cartridge from said drive unit through said inlet/outlet end, an accessor for carrying said cartridge between said cartridge load/unload mechanism, said cell unit, and said drive unit; and a stopper for stopping an ejected cartridge at a predetermined point before the cartridge leaves said drive unit, said stopper having a member pivotally mounted to said drive unit, a roller rotatably mounted on said member, and an elastic member for pivotably biasing said roller in an ejecting direction of said cartridge, said ejecting direction being a direction heading away from said inlet/outlet end in an exterior of said drive unit, wherein in inserting said cartridge into said drive unit by means of said accessor, said stopper allows insertion of said cartridge into said drive unit and in ejecting said cartridge from said drive unit, said stopper stops said cartridge before said cartridge obstructs movement of said accessor.

8. A library device according to claim 7, wherein said accessor further has a hand mechanism for gripping said cartridge, said hand mechanism having a front end formed with a pair of projections adapted to push said cartridge into said drive unit; and said stopper further includes a pair of stopper mechanisms corresponding to said pair of projections of said hand mechanism.

9. A library device according to claim 7, wherein said stopper further includes a means for limiting a pivotal motion of said roller in said ejecting direction of said cartridge.

* * * * *